United States Patent
Goto

(10) Patent No.: US 11,416,892 B2
(45) Date of Patent: Aug. 16, 2022

(54) NON-TRANSITORY COMPUTER-READABLE RECORDING MEDIUM, DETERMINATION METHOD, AND INFORMATION PROCESSING APPARATUS

(71) Applicant: FUJITSU LIMITED, Kawasaki (JP)

(72) Inventor: Keisuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 16/799,925

(22) Filed: Feb. 25, 2020

(65) Prior Publication Data
US 2020/0279290 A1    Sep. 3, 2020

(30) Foreign Application Priority Data

Feb. 28, 2019    (JP) .............................. JP2019-036604

(51) Int. Cl.
| | | |
|---|---|---|
| G06Q 30/00 | (2012.01) | |
| G06Q 30/02 | (2012.01) | |
| G06N 20/00 | (2019.01) | |
| G06K 9/62 | (2022.01) | |
| G06N 5/04 | (2006.01) | |

(52) U.S. Cl.
CPC ....... G06Q 30/0255 (2013.01); G06K 9/6215 (2013.01); G06K 9/6257 (2013.01); G06N 5/04 (2013.01); G06N 20/00 (2019.01)

(58) Field of Classification Search
None
See application file for complete search history.

(56) References Cited

U.S. PATENT DOCUMENTS

| | | | | |
|---|---|---|---|---|
| 2009/0164395 | A1* | 6/2009 | Heck ..................... | G06F 16/954 706/16 |
| 2015/0149553 | A1* | 5/2015 | Kawanaka .............. | H04L 67/22 709/204 |
| 2015/0269609 | A1* | 9/2015 | Mehanian .......... | G06Q 30/0246 705/14.45 |

(Continued)

FOREIGN PATENT DOCUMENTS

CN    107578281    1/2018

OTHER PUBLICATIONS

IP.com NPL Search Strategy (Year: 2021).*

(Continued)

*Primary Examiner* — Matthew T Sittner
(74) *Attorney, Agent, or Firm* — Fujitsu Patent Center

(57) ABSTRACT

A server inputs behavior information of a target to a trained machine learning model that learn a plurality of association relations obtained by associating combinations of behaviors generated from a plurality of behaviors included in a plurality of training data items with likelihoods indicating certainties that the combinations of the behaviors are in a specific state, the trained machine learning having been trained by using the plurality of training data items obtained by associating combinations of behaviors of persons corresponding to the specific state. The server specifies a difference between the combination of the behaviors in each of the plurality of association relations and the behavior information of the target based on output results of the trained machine learning model, and determines an additional behavior for causing the target to transit to the specific state based on the likelihood the difference.

6 Claims, 23 Drawing Sheets

(56) References Cited

U.S. PATENT DOCUMENTS

2015/0278709 A1* 10/2015 Zeng ..................... G06N 3/084
  706/12
2017/0236081 A1* 8/2017 Grady Smith ..... G06Q 10/0637
  705/7.36

OTHER PUBLICATIONS

EESR—The Extended European Search Report for European Patent Application No. 20158458.8 dated Jul. 13, 2020.
Jong-hwa Kim et al., "A Structure Analysis of Consumer Purchasing Perceptions in the Internet Shopping: In Case of the Fresh Food in South Korea", Food System Research vol. 19, No. 4 (2013); Faculty of Agriculture, Kyushu University, Seok-jung Yoon, Korea Fisheries Association; pp. 382-393 (Total 12 pages).

* cited by examiner

FIG.9
[USER LOG OF WHICH STATE IS UNKNOWN]
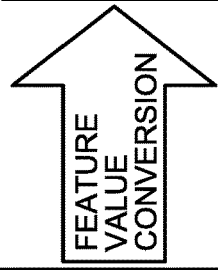
| ACCESS TO TOP PAGE | SEMINAR PARTICIPA- TION | ACCESS TO PRODUCT PRICE PAGE | PAGE ACCESS OF 5 TIMES OR MORE | PAGE ACCESS OF 20 TIMES OR MORE |
|---|---|---|---|---|
| Y | Y | N | Y | N |

| | | | | H1 | H2 | H3 | H4 | H5 | H6 | H7 | H8 | H9 | H10 | H11 |
|---|---|---|---|---|---|---|---|---|---|---|---|---|---|---|
| | | | | C | CD | BD | BD | BC | BD | AD | AB | AB | AD | AC |
| | | | | + | − | − | + | − | + | + | + | − | − | − |
| A | B | C | D | | | | | | | | | | | |
| 0 | 0 | 0 | 0 | 1 | 0 | 1 | 0 | 0 | 0 | 0 | 0 | 1 | 0 | 0 | N₁
| 0 | 0 | 0 | 1 | 1 | 0 | 0 | 0 | 0 | 0 | 1 | 0 | 1 | 0 | 0 | IN₂
| 0 | 0 | 1 | 0 | 0 | 1 | 1 | 0 | 1 | 0 | 0 | 0 | 1 | 0 | 0 | P₁
| 0 | 0 | 1 | 1 | 0 | 0 | 0 | 1 | 0 | 1 | 1 | 1 | 0 | 0 | 0 | IN₃
| 0 | 1 | 0 | 0 | 1 | 0 | 0 | 0 | 0 | 1 | 0 | 1 | 0 | 0 | 0 | IN₁
| 0 | 1 | 0 | 1 | 0 | 1 | 1 | 0 | 0 | 0 | 1 | 1 | 0 | 0 | 0 | P₂
| 0 | 1 | 1 | 0 | 1 | 0 | 0 | 1 | 1 | 0 | 0 | 1 | 0 | 0 | 0 | P₃
| 0 | 1 | 1 | 1 | 0 | 1 | 1 | 1 | 0 | 0 | 0 | 0 | 0 | 1 | 1 | N₂
| 1 | 0 | 0 | 0 | 0 | 0 | 0 | 0 | 1 | 1 | 0 | 0 | 0 | 1 | 0 | |
| 1 | 0 | 0 | 1 | 1 | 1 | 0 | 0 | 1 | 0 | 0 | 0 | 0 | 1 | 0 | P₄
| 1 | 0 | 1 | 0 | 0 | 0 | 1 | 0 | 0 | 1 | 1 | 0 | 0 | 1 | 1 | |
| 1 | 0 | 1 | 1 | 1 | 1 | 0 | 0 | 0 | 0 | 0 | 0 | 0 | 0 | 1 | N₃ |

NON-TRANSITORY COMPUTER-READABLE RECORDING MEDIUM, DETERMINATION METHOD, AND INFORMATION PROCESSING APPARATUS

CROSS-REFERENCE TO RELATED APPLICATION

This application is based upon and claims the benefit of priority of the prior Japanese Patent Application No. 2019-036604, filed on Feb. 28, 2019, the entire contents of which are incorporated herein by reference.

FIELD

The embodiment discussed herein is related to a determination program, a determination method, and an information processing apparatus.

BACKGROUND

In digital marketing, in order to increase a marketing effect, a behavior log of a web page accessed by persons having various purposes is analyzed. Specifically, state transition of behaviors of a user until the user purchases a product can be expressed as a time series. For example, the behavior of the user starts from a "little interest" state in which an interest is little at first, gradually transitions to a "great interest" state in which the interest is great, and finally transitions to an "intention to purchase" state in which the user decides to purchase the product. Basically, the states have an order, and the behavior can transition, for example, from the "great interest" state to the "intention to purchase" state, but not vice versa.

Accordingly, the user can be encouraged to take an action for encouraging the state transition by quickly knowing which state the user is in and which action the user is to take in order to transition to another state, and it is possible to increase the marketing effect. Thus, an administrator discriminates a current state from a behavior history of the user, and generates a rule for deciding an action. For example, a rule for distributing a coupon is used for a user who accesses 10 times or more and accesses a product price page.

Non-patent Document 1: KIM Jong-hwa, MORITAKA Masahiro, FUKUDA Susumu, and YOON Seok-jung, "A Structure Analysis of Consumer Purchasing Perceptions in the Internet Shopping", Food System Research, 2012, Vol. 19, No. 4, pp. 382-393, 2013 Dec. 5

However, it is difficult to consider an action from the behavior history in a manual manner in order for the user to transition to the next state. Cost may be high, the generation of the rule may be leaked, and real time properties may be unfavorable.

As described above, since it is difficult to encourage the state transition of the user by manual analysis, a method using a decision tree that predicts the state from the behavior history is also considered. For example, training data items are generated by adding a label of a state i to data up to each state i of each user. A decision tree model that determines whether or not each state j is the state j is generated. At this time, as many models (decision trees) as the number of states are generated. Thereafter, when user data and state i are given, corrections of features are listed such that the decision tree for determining the state i is determined as positive.

However, there are many patterns for a decision tree correction method, but since an effective correction method is not obvious and it is not clear which part of the decision tree is important, the parts to be corrected are finally searched for in a manual manner. As stated above, neither a manual analysis method nor a method using the decision tree is an efficient method.

SUMMARY

According to an aspect of an embodiment, a non-transitory computer-readable recording medium stores therein a determination program that causes a computer to execute a process. The process includes inputting behavior information of a target to a trained machine learning model that learn a plurality of association relations obtained by associating combinations of behaviors generated from a plurality of behaviors included in a plurality of training data items with likelihoods indicating certainties that the combinations of the behaviors are in a specific state of a plurality of states, the trained machine learning having been trained by using the plurality of training data items obtained by associating combinations of behaviors of persons corresponding to the specific state with the specific state; specifying a difference between the combination of the behaviors in each of the plurality of association relations and the behavior information of the target based on output results of the trained machine learning model; and determining an additional behavior for causing the target to transit to the specific state based on the likelihood associated with the combination of the behaviors and the difference between the combination of the behaviors and the behavior information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram for describing conversion from a user log into a feature value;

FIG. 16 is an explanatory diagram illustrating an example of the training data;

FIG. 21 is an explanatory diagram for describing the hypothesis appropriate for input data;

DESCRIPTION OF EMBODIMENTS

Preferred embodiments will be explained with reference to accompanying drawings. The present invention is not limited to the embodiments. The embodiments can be appropriately combined within a consistent range.

[a] First Embodiment

Overall Configuration

Figure 1:
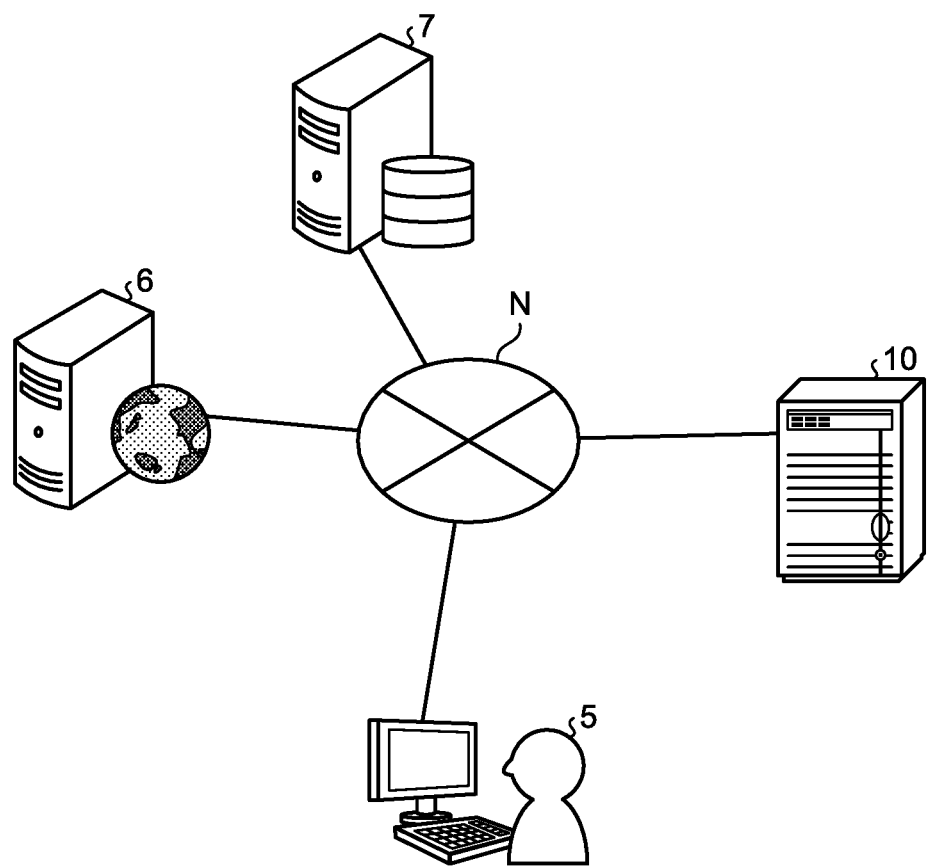
FIG. 1 is a diagram illustrating an overall configuration example of a system according to a first embodiment.

FIG. 1 is a diagram illustrating an example of an overall configuration of a system according to a first embodiment. As illustrated in FIG. 1, in this system, a user terminal 5, a Web server 6, a database server 7, and a model generation server 10 are connected via a network N so as to communicate with each other. Various communication networks such as the Internet and a dedicated line regardless of a wired or wireless manner can be employed as the network N.

The user terminal 5 is an example of a terminal used by a user who accesses the Web server 6 by using a Web browser, and is, for example, a computer device such as a smartphone, a mobile phone, or a personal computer. For example, the user terminal 5 accesses the Web server 6 to search for a product or purchase a product.

The Web server 6 is an example of a server device that provides Web services to the user terminal 5. For example, the Web server 6 provides Web shopping and searching services to the accessing user terminal 5.

The database server 7 is an example of a database server that accumulates a behavior history of each user terminal using the Web server 6. That is, the database server 7 stores an access history of each of a plurality of users.

The model generation server 10 is an example of a server device that analyzes the behavior history of the user stored in the database server 7 and generates a model that specifies a state of the user. The model generation server 10 is an example of a server device that acquires a log of the user from the Web server 6, estimates the state of the user by using the generated model, and specifies an action for transitioning the state of the user. The server device that generates the model and the server device that specifies the action can also be realized by separate server devices.

Figure 2:
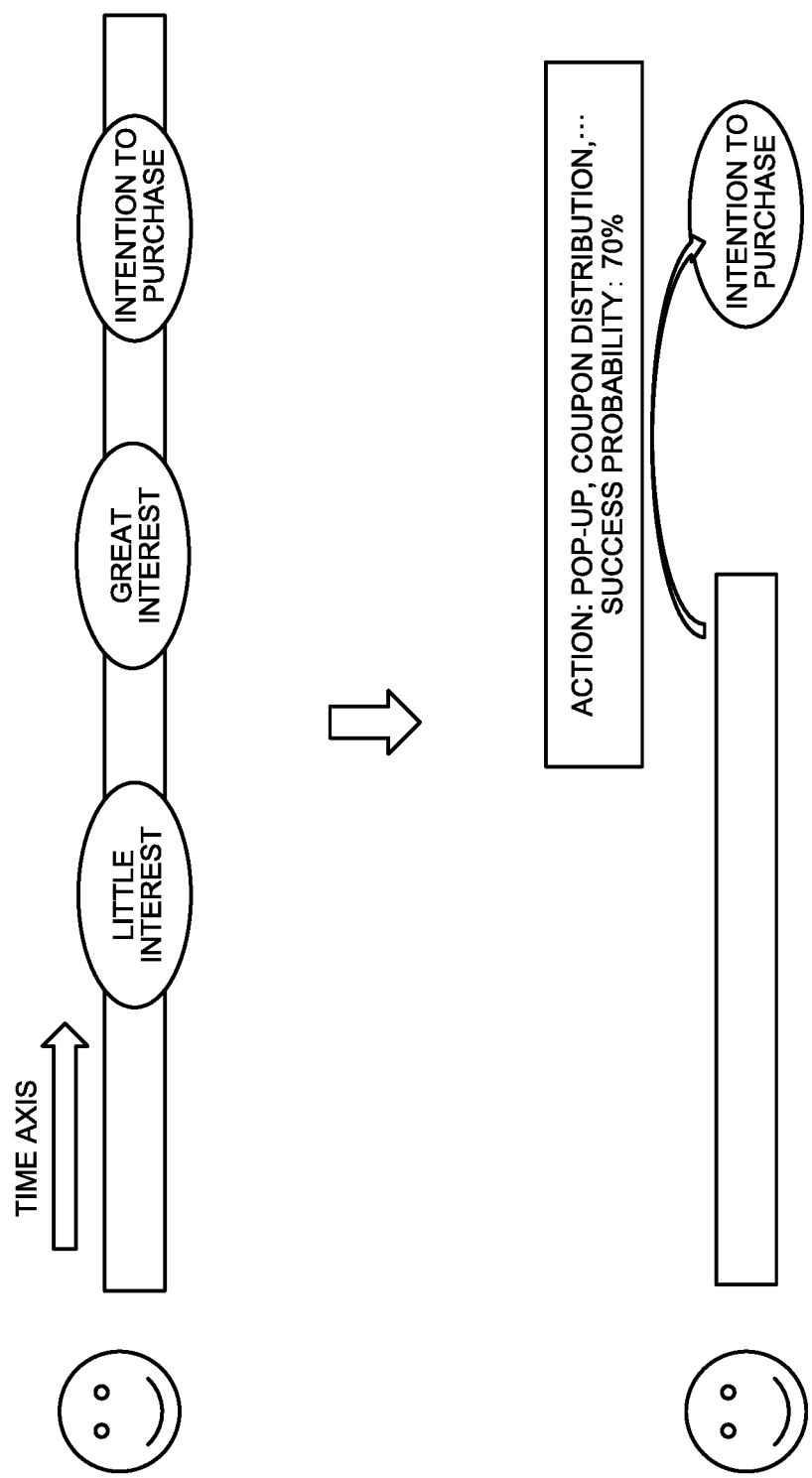
FIG. 2 is a diagram for describing state transitions and actions according to the first embodiment.

FIG. 2 is a diagram for describing state transitions and actions according to the first embodiment. As illustrated in FIG. 2, in general, a user who purchases a product by accessing the Web server 6 sequentially transitions to a "little interest" state in which an interest in the product is little, a "great interest" state in which an interest in the product is great, and an "intention to purchase" state in which a purchasing intention is enhanced during a time from the access starting to the purchasing, and ultimately purchases the product.

However, the user does not necessarily transition from the "little interest" state to the "intention to purchase" state without hesitation. For example, the user looks at another product and reviews about the product, or reviews whether or not the product is really needed for the user. Therefore, as illustrated in FIG. 2, the model generation server 10 determines the state of the user, and specifies the next action that can cause the user to transition to the "intention to purchase" state. For example, the model generation server 10 determines that the user can transition to the "intention to purchase" state by performing an action of "pop-up" or an action of "coupon distribution" for the user who is in the "great interest" state.

Thereafter, the model generation server 10 notifies the Web server 6 of information on the specified action. The Web server 6 that receives the information of this action performs the action for the user terminal 5. For example, the Web server 6 distributes coupons on a Web browser being used by the user terminal 5 for access.

As described above, since the model generation server 10 can automatically specify the action from the behavior history by hand in order for the user to transition to the next state, it is possible to efficiently encourage the state transition of the user.

Functional Configuration

Figure 3:
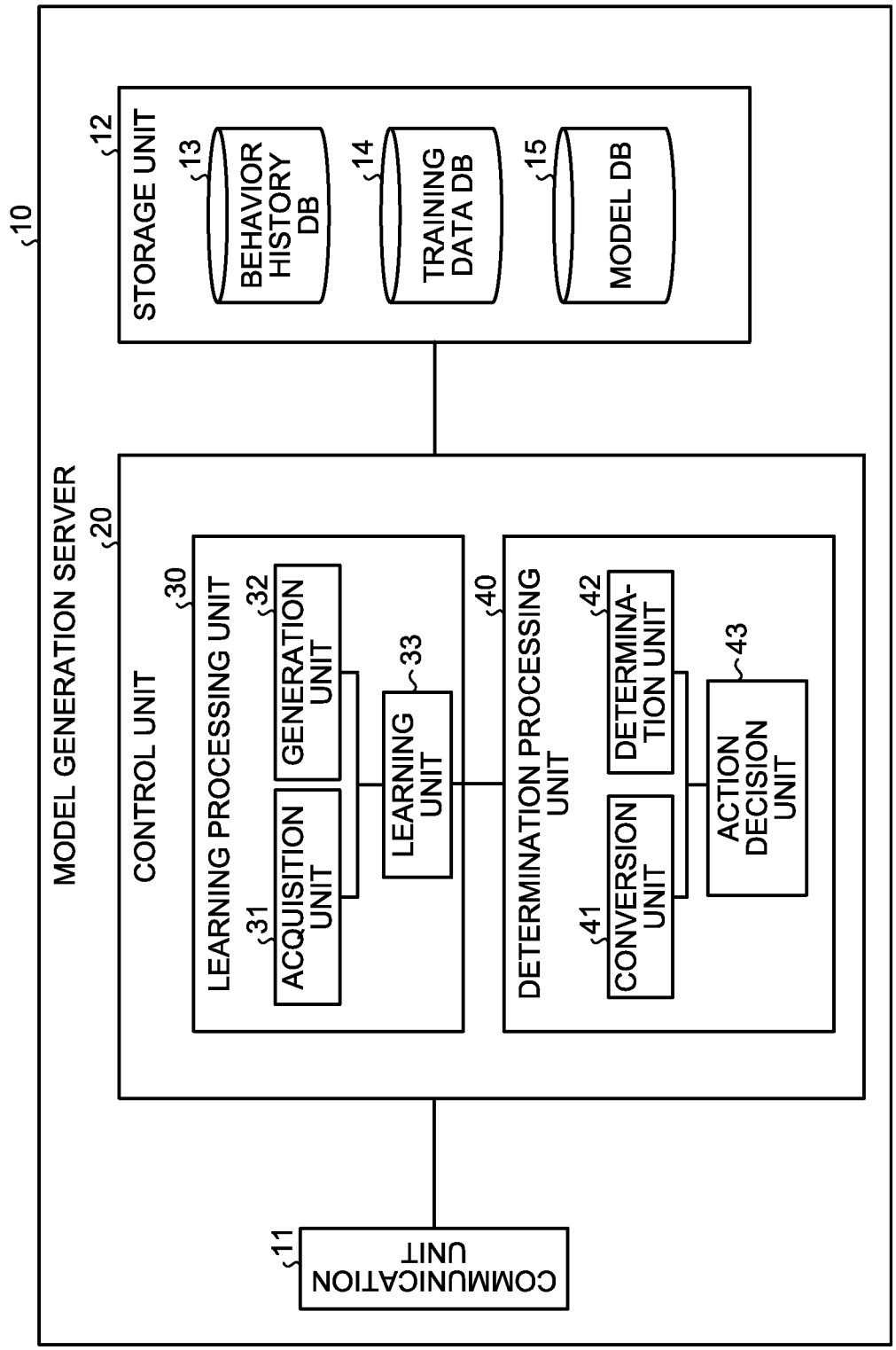
FIG. 3 is a functional block diagram of a functional configuration of a model generation server according to the first embodiment.

FIG. 3 is a functional block diagram of a functional configuration of the model generation server 10 according to the first embodiment. As illustrated in FIG. 3, the model generation server 10 includes a communication unit 11, a storage unit 12, and a control unit 20.

The communication unit 11 is a processing unit that controls communication with other devices, and is, for example, a communication interface. For example, the communication unit 11 receives a user log indicating the current access state of the user from the Web server 6, receives the behavior history of each user from the database server 7, and transmits information regarding an action for causing the user to transition to the next state to the Web server 6.

The storage unit 12 is an example of a storage device that stores data or a program executed by the control unit 20, and is, for example, a memory or a hard disk. The storage unit 12 stores a behavior history DB 13, a training data DB 14, and a model DB 15.

The behavior history DB 13 is a database that stores the behavior history of each user. For example, the behavior history DB 13 stores "date and time" indicating an accessed date and time and an "accessed page" indicating an accessed Web page in association with each other for each user.

The training data DB 14 is a database that stores training data for learning (i.e. training) each model for each model for discriminating each state. For example, the training data DB 14 stores so-called teaching data in which "classes" that are objective variables (labels) and "feature values" that are explanatory variables are associated with each model.

The model DB 15 is a database that stores information regarding each model for discriminating each state. For example, the model DB 15 stores learning results and various parameters for constructing each learned model (i.e. each trained model).

The control unit 20 is a processing unit that controls the entire model generation server 10, and is, for example, a processor. The control unit 20 includes a learning processing unit 30 and a determination processing unit 40, and performs a process of learning a model that specifies the state of the user and a determination process of specifying an action that encourages the state transition. The learning processing unit 30 and the determination processing unit 40 are an example of an electronic circuit included in the processor and an example of a process performed by the processor.

Figure 4:
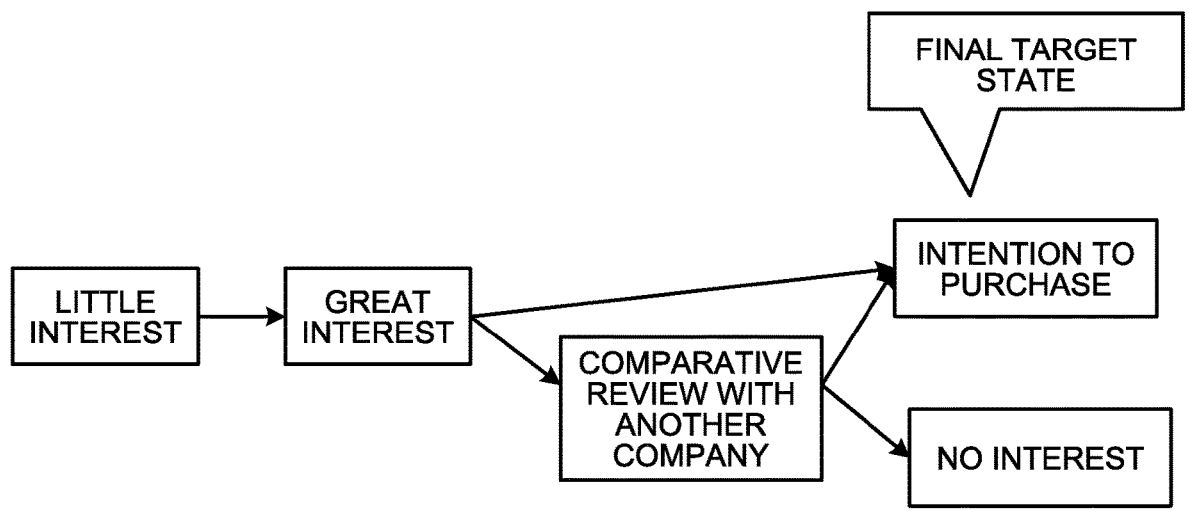
FIG. 4 is a diagram for describing assumed state transitions.

The learning processing unit 30 includes an acquisition unit 31, a generation unit 32, and a learning unit 33, and is a processing unit that performs the process of learning the model that specifies the state of the user. Here, the state of the user assumed in the present embodiment will be described. FIG. 4 is a diagram for describing an assumed state transition. As illustrated in FIG. 4, the user transitions to the "little interest" state, the "great interest" state, a "comparative review with another company" state, the "intention to purchase" state, and a "no interest" state from when the user starts accessing the Web server 6 to when purchasing the product.

Here, the state transitions from the "little interest" state to the "great interest" state, from the "great interest" state to the "comparative review with another company" state or the "intention to purchase" state, and from the "comparative review with another company" state to the "intention to purchase" state or the "no interest" state. As can be seen from these state transitions, since the state transitions from the "great interest" state to two states, it is possible to increase a marketing effect by quickly specifying the state of the user and taking the action for encouraging the user to transition to the "intention to purchase" state.

The acquisition unit 31 is a processing unit that acquires the behavior history of each user. For example, the acquisition unit 31 acquires the behavior history of each user from the database server 7 at any timing such as a timing at which learning is started, and stores the acquired behavior history in the behavior history DB 13.

The generation unit 32 is a processing unit that generates training data of each model from the behavior history of each user. Specifically, the generation unit 32 generates, as training data for a model for determining each state, the behavior history up to an access content characterizing each state, and stores the generated behavior history in the training data DB 14.

Figure 5:
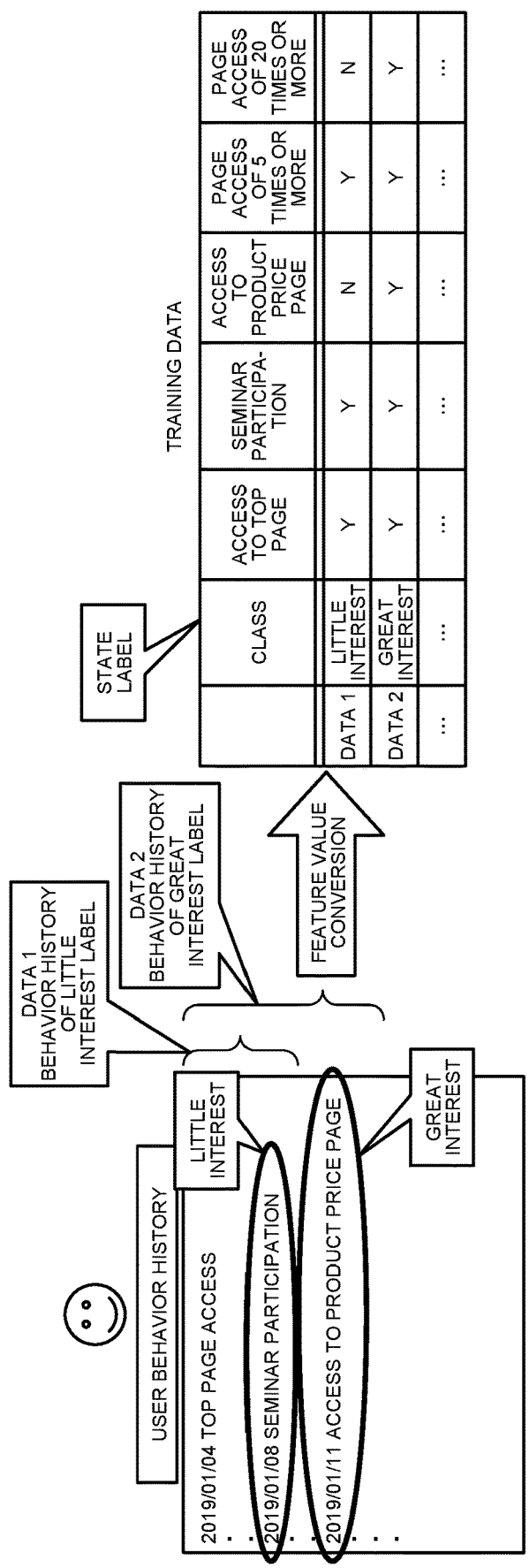
FIG. 5 is a diagram for describing a generation example of training data.

FIG. 5 is a diagram for describing a generation example of the training data. As illustrated in FIG. 5, the generation unit 32 sets, as data 1, a behavior history from "2019/01/04 top page access" which is a top of the behavior history to a behavior "seminar participation" characterizing the "little interest" state while referring to the behavior history of a certain user. The generation unit 32 converts the behavior history included in data 1 into a feature value, and generates training data associated with a "class" indicating a label of the state. For example, the generation unit 32 sets "little interest" to "class" of data 1, and generates training data in which "Y, Y, N, Y, N" is set as a feature value "top page access, seminar participation, access to product price page, page access of 5 times or more, page access of 20 times or more".

The generation unit 32 sets, as data 2, a behavior history from "2019/01/04 top page access" which is a top of the behavior history to a behavior "product price page access" characterizing the "great interest" state while referring to the behavior history of a certain user. The generation unit 32 sets "great interest" to "class" of data 2, and generates training data in which "Y, Y, Y, Y, Y" is set as a feature value "top page access, seminar participation, access to product price page, page access of times or more, page access of 20 times or more".

The behavior characterizing the state is an example, and can be arbitrarily changed. Conversion of setting contents and feature values of labels is an example, and can be arbitrarily changed. As the item of the feature value, "Y" is set when a condition is satisfied, and "N" is set when the condition is not satisfied. For example, when the history of "top page access" is included in the behavior history, "Y" is set to the feature value "top page access", and when the history of "page access" is included four times in the behavior history, "N" is set to the feature value "page access of 5 times or more".

Figure 6:
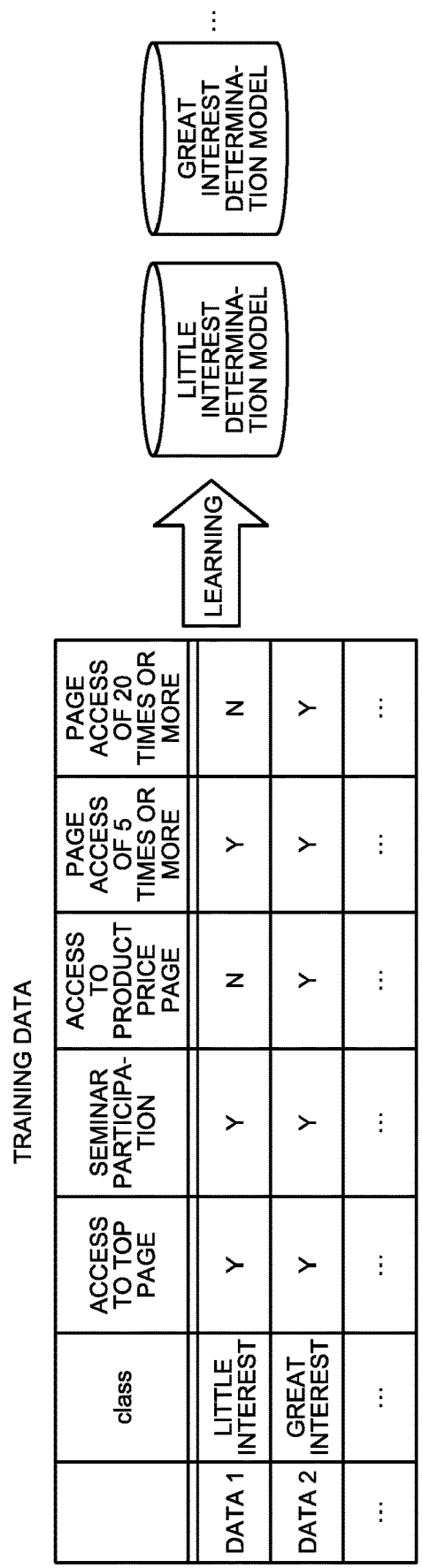
FIG. 6 is a diagram for describing learning of each model.

The learning unit 33 is a processing unit that performs the learning of each model that determines each state by using the training data generated by the generation unit 32. FIG. 6 is a diagram for describing the learning of each model. As illustrated in FIG. 6, the learning unit 33 reads out the data such as data 1 in which "little interest" is set to "class" from the training data DB 14, and learns a little interest determination model that determines the "little interest" state by using "class" as the objective variable and "feature value" as the explanatory variable.

Similarly, the learning unit 33 reads out the data such as data 2 in which "great interest" is set to "class" from the training data DB 14, and learns a great interest determination model that determines the "great interest" state. As described above, the learning unit 33 learns the determination model of each state by using each teaching data corresponding to each state (class) of the "little interest" state, the "great interest" state, the "comparative review with another company" state, the "intention to purchase" state, and the "no interest" state. The learning unit 33 stores, as a learning result, various parameters for constructing the model in the model DB 15.

Figure 7:
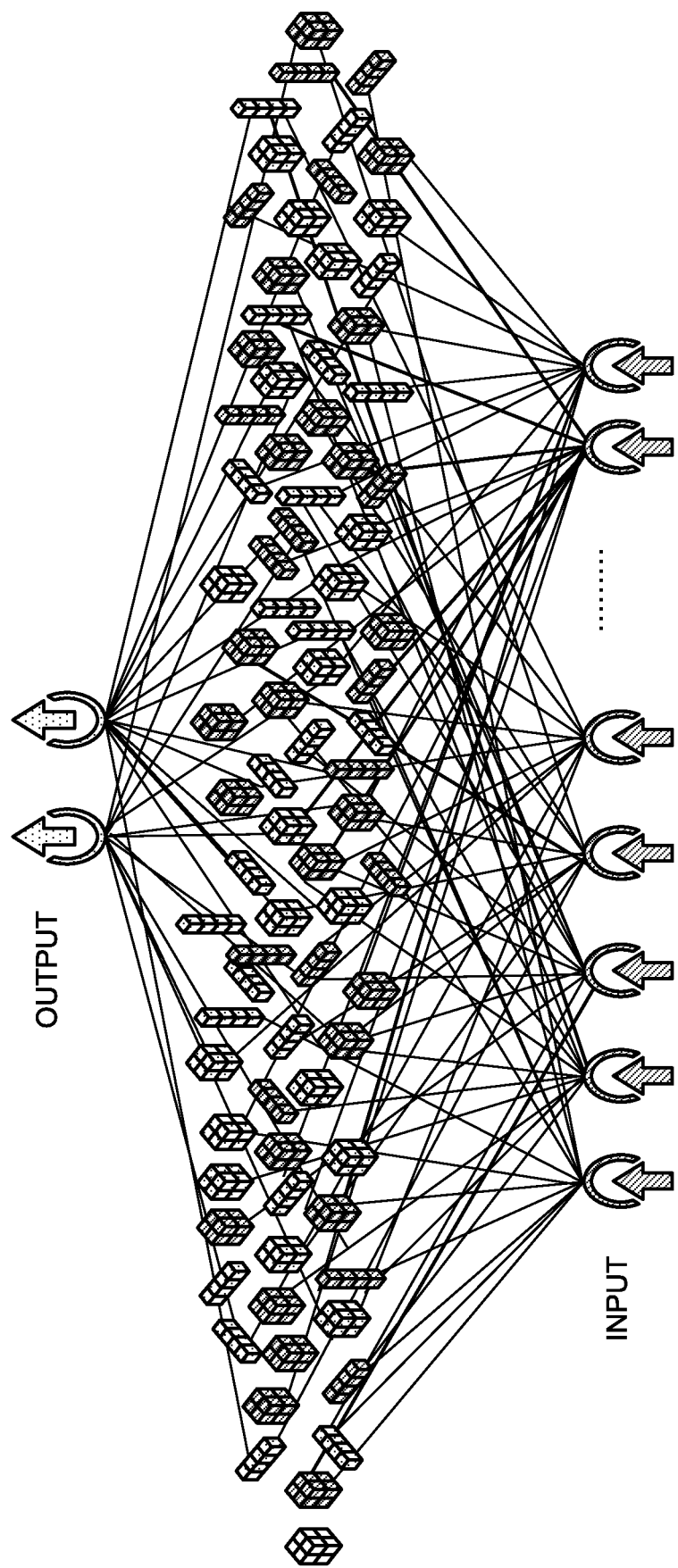
FIG. 7 is a diagram for describing a learning method.
Figure 8:
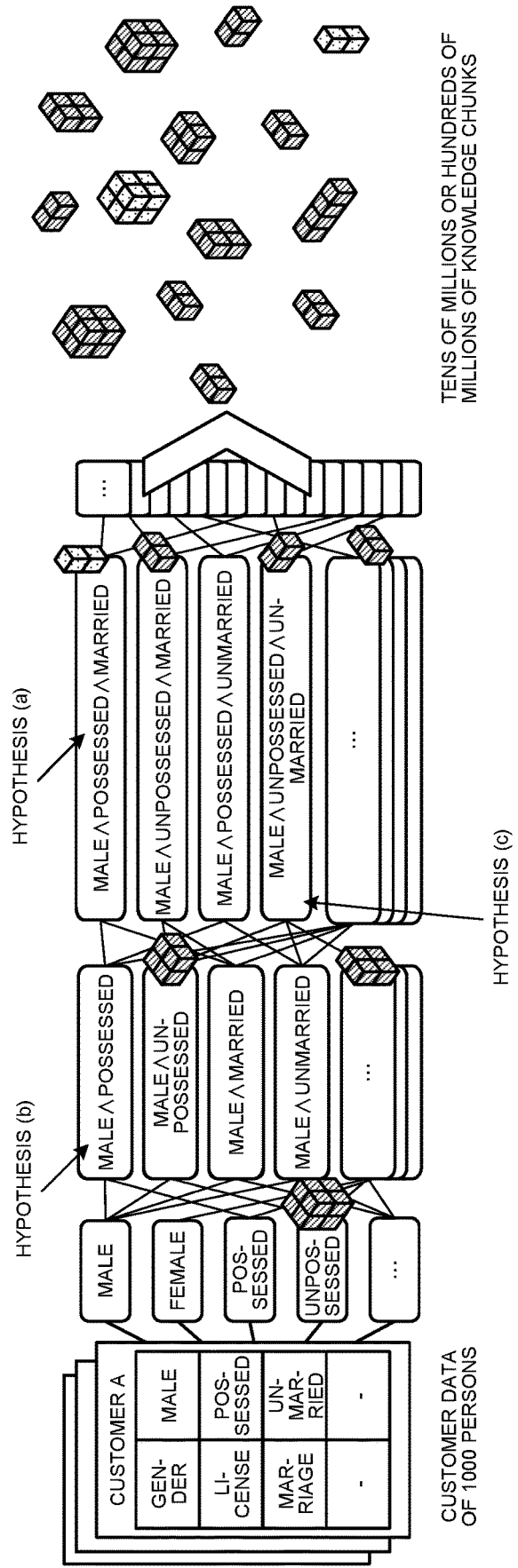
FIG. 8 is a diagram for describing the learning method.

Here, an example of a learning method of the learning unit 33 will be described. FIGS. 7 and 8 are diagrams for describing the learning method. In general, since accuracy improvement is realized by layering neural networks that imitate a structure of a human brain's neural circuit by several layers and refining one model, deep learning is a complicated model that is not capable of being understood by human. Meanwhile, as illustrated in FIG. 7, as one of machine learning, the learning unit 33 extracts a large number of hypotheses by combining data items, and performs machine learning for constructing a highly accurate classification model by adjusting a degree of influence of the hypothesis (knowledge chunk (hereinafter, simply referred to as a "chunk"). The knowledge chunk is a simple model that can be understood by human, and is a model in which the hypothesis that is likely to be established as an input and output relationship is described in a logical expression.

Specifically, the learning unit 33 judges the importance of the hypothesis at a hit rate of a classification label for each hypothesis by using, as the hypothesis (chunk), a combination pattern of all data items of the input data. The learning unit 33 constructs the classification model based on the plurality of extracted knowledge chunks and labels. At this time, when the items constituting the knowledge chunk are greatly overlapped with the items constituting another knowledge chunk, the learning unit 33 performs control so as to reduce a degree of influence on the classification model.

A specific example will be described with reference to FIG. 8. Here, an example when it is desired to judge a customer who purchases a certain product or service is considered. Customer data includes various items such as "gender", "possession of license", "marriage", "age", and "annual income". The importance of each hypothesis is considered by using all combinations of these items as the hypotheses. For example, there are 10 customers in the data corresponding to a hypothesis (a) which is a combination of items ""male", "possessed", and "married"". When 9 persons out of these 10 persons purchase products, a hypothesis "persons corresponding to a combination of the items "male", "possessed", and "married" purchase products" is used as a hypothesis with high hit rate, and is extracted as the knowledge chunk.

Meanwhile, there are 100 customers in the data corresponding to a hypothesis (b) which is a combination of items ""male" and "possessed"". When only 60 persons out of these 100 persons purchase products, since a purchase hit rate is 60% and is less than a threshold (for example, 80), a hypothesis "persons corresponding to a combination of the items "male" and "possessed" purchase products" is used as a hypothesis with a low hit rate, and is not extracted as the knowledge chunk.

There are 20 customers in the data corresponding to a hypothesis (c) which is a combination of items ""male", "unpossessed", and "unmarried"". When 18 persons out of these 20 persons do not purchase products, since an unpurchased hit rate is 90% and is equal to or greater than the threshold (for example, 80), a hypothesis "persons corresponding to a combination of items of "male", "unpossessed", and "unmarried" do not purchase products" is used as a hypothesis with high hit rate, and is extracted as the knowledge chunk.

As described above, the learning unit 33 takes out tens of millions or hundreds of millions of knowledge chunks that support purchasing and support non-purchasing, and performs the learning of the model. The model learned in this manner gives a weight that is an example of likelihood indicating certainty to each hypothesis by enumerating combinations of features as hypotheses (chunks), calculates, as a score, the sum of the weights of the hypotheses appearing in the input data, and outputs a positive example when the score is equal to or greater than a threshold.

That is, the score is an index indicating the certainty of the state, and is the sum of weights of chunks that satisfy all the belonging features among the chunks (hypotheses) generated by each model. For example, in a state in which chunk A is associated with "weight: 20, features (A1, A2)", chunk B is associated with "weight: 5, features (B1)", and chunk C is associated with "weight: 10, features (C1, C2)", it is assumed that there is a behavior (A1, A2, B1, C1) in the user log. At this time, since all the features of chunk A and chunk B appear, the score is "20+5=25". The feature herein corresponds to the behavior of the user.

Referring back to FIG. 3, the determination processing unit 40 includes a conversion unit 41, a determination unit 42, and an action decision unit 43, and is a processing unit that decides an action that encourages the state determination or the state transition using the learned model.

The conversion unit 41 is a processing unit that converts the user log into the feature value. Specifically, the conversion unit 41 acquires the user log indicating the current behavior of the user as a state determination target from the Web server 6, and converts the acquired user log into the feature value by using the same criteria and method as those of the learning processing unit 30. The conversion unit 41 outputs the feature value to the determination unit 42.

FIG. 9 is a diagram for describing the conversion from the user log into the feature value. As illustrated in FIG. 9, the conversion unit 41 acquires, as a user log of which the state is unknown, a user log including "2019/01/04 top page access" to "2019/01/08 seminar participation". The conversion unit 41 counts the access contents included in the user log, and converts the counted access contents into the feature value "(top page access, seminar participation, access to product price page, page access of 5 times or more, page access of 20 times or more)" having the same items as the items used in the learning processing unit 30. Here, it is assumed that the conversion unit 41 converts the user log into the feature value "Y, Y, N, Y, N".

The determination unit 42 is a processing unit that determines the state of the user by using each learned determination model and the feature value of the user log converted by the conversion unit 41. Specifically, the determination unit 42 acquires the parameters of each determination model from the model DB 15, and constructs each learned determination model. The determination unit 42 inputs the feature value acquired from the conversion unit 41 to each learned model, and acquires a determination result of each model. Thereafter, the determination unit 42 determines the state of the user based on the determination result of each model, specifies the next transition destination of the state of the user, and outputs the results thereof to the action decision unit 43.

Figure 10:
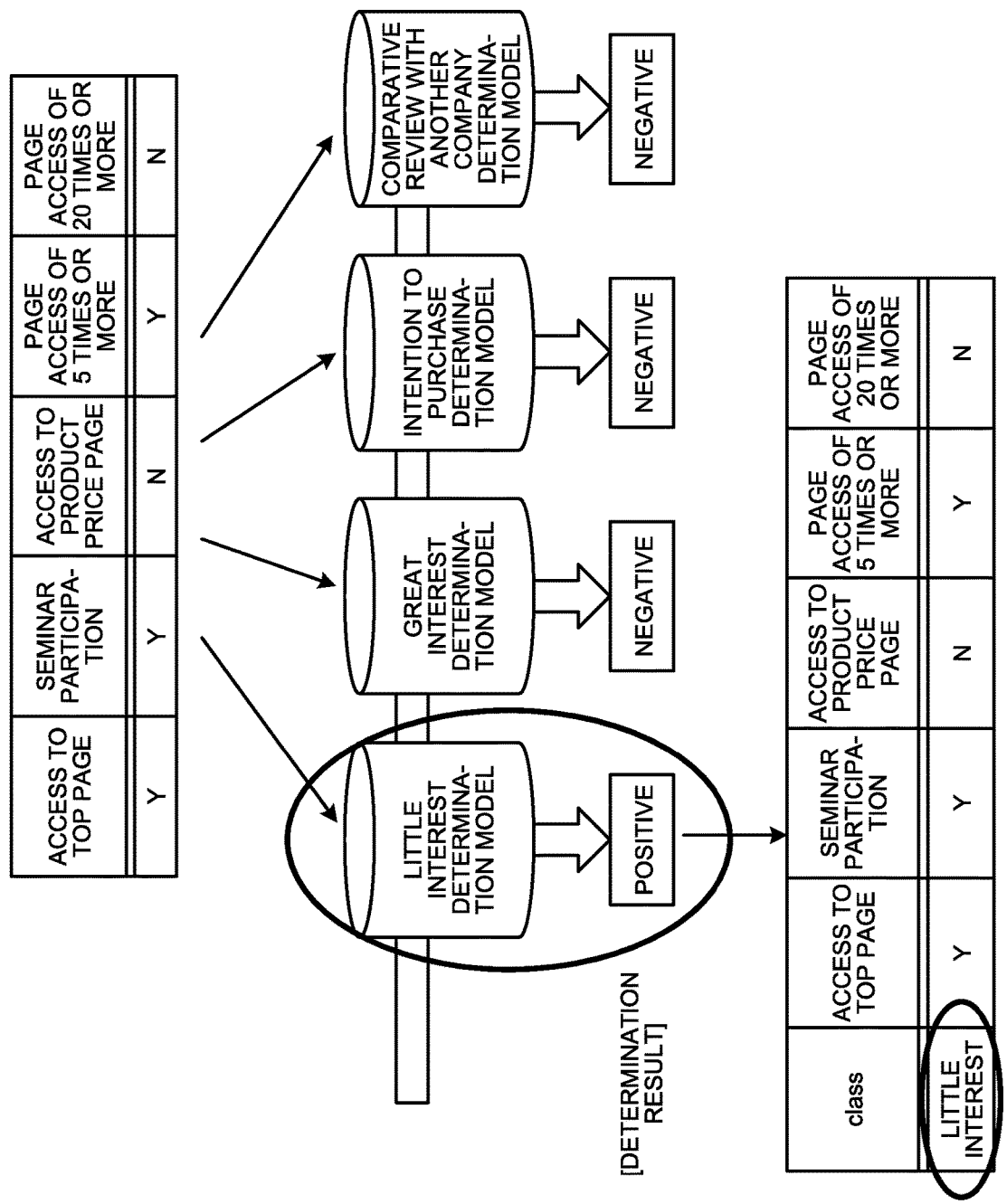
FIG. 10 is a diagram for describing state determination.

FIG. 10 is a diagram for describing the state determination. As illustrated in FIG. 10, the determination unit 42 inputs the feature value of the user log to each model of a little interest determination model, a great interest determination model, an intention to purchase determination model, and a comparative review with another company model. The determination unit 42 acquires a determination result "positive" from the little interest determination model, a determination result "negative" from the great interest determination model, a determination result "negative" from the intention to purchase determination model, and a determination result "negative" from the comparative review with another company model.

Here, each determination model generates the combination of the items (features) including the feature values as the hypothesis from the input feature values, calculates the score that is the sum of the weights of the hypotheses appearing in the input data, and outputs a positive example when the score is equal to or greater than the threshold. In the example of FIG. 10, since only the determination result of the little interest determination model is "positive", the determination unit 42 determines that the state of the user is the "little interest" state, and associates the determination result with the input data. When the output results of the plurality of determination models are "positive", the result of the determination model close to the final target state is selected.

Figure 11:
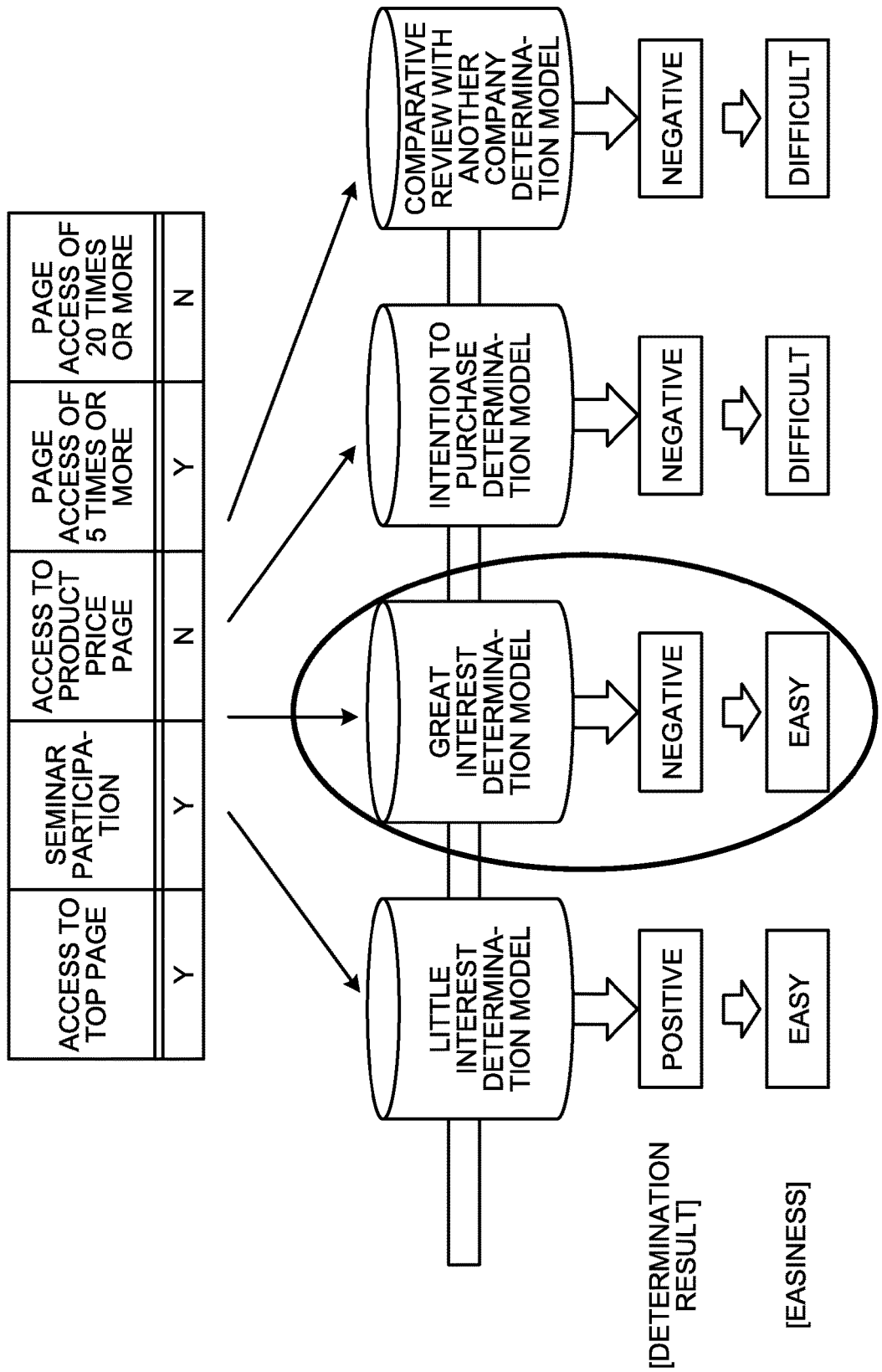
FIG. 11 is a diagram for specifying a state of a transition destination.

The determination unit 42 specifies the next transition destination of the state of the user based on the determination result of each model. FIG. 11 is a diagram for specifying the state of the transition destination. As illustrated in FIG. 11, the determination unit 42 determines state change easiness (easiness) according to the determination result of each model. Here, the state change easiness is output as "easy" when the determination result of the current state model is "positive" or the determination result of the previous state model is "positive", and is output as "difficult" in other cases.

In the example of FIG. 11, since the determination result of the little interest determination model is "positive", the determination unit 42 determines that the easiness is "easy". In addition, since the determination result of the great interest determination model is "negative" but the determination result of the little interest determination model that determines the previous state is "positive", the determination unit 42 determines that the easiness is "easy". Since both the determination results of the intention to purchase determination model and the comparative review with another company determination model are "negative" and the determination result of the previous state is also "negative", the determination unit 42 determines that the easiness is "difficult". When it is determined that the easiness of the plurality of states is "easy", the determination unit 42 selects the state closest to the final target state from the states of which the easiness is "easy".

The action decision unit 43 is a processing unit that decides an action for causing the user to transition to a state in which the determination unit 42 determines that the easiness is "easy" (hereinafter, referred to as a "next state"). Specifically, the action decision unit 43 preferentially lists chunks determined to be positive by the determination model corresponding to the next state in order of chunks with a large weight and a small number of corrections.

Figure 12:
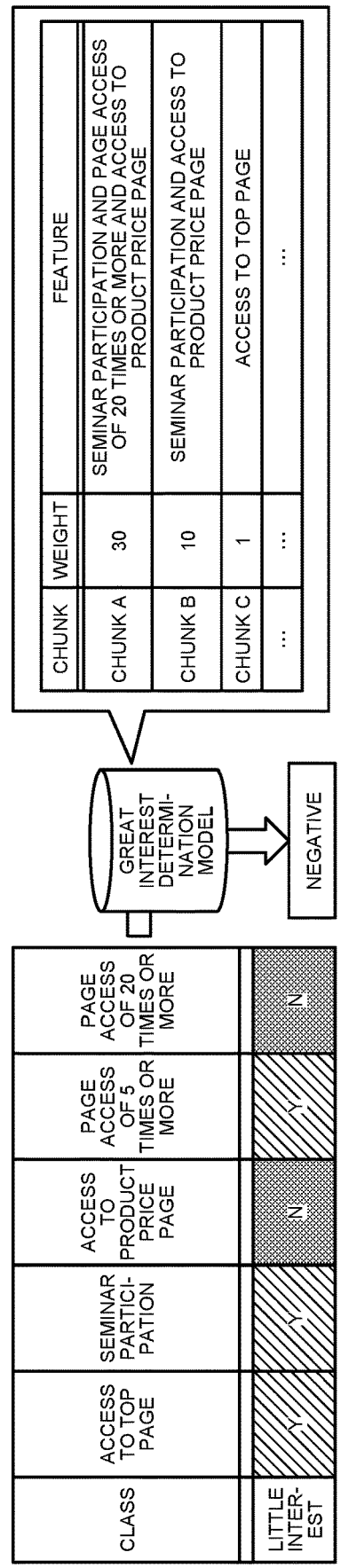
FIG. 12 is a diagram for specifying an action content recommended to a user.

FIG. 12 is a diagram for specifying the action content recommended to the user. As illustrated in FIG. 12, the action decision unit 43 acquires results of the chunks (hypotheses) of the great interest determination model corresponding to the next state determined as the transition destination. Here, chunk A to which a weight of "80" is set includes "seminar participation, page access of times or more, access to product price page" as the features. "Seminar participation" already appears in the user log, and "page access of 20 times or more, access to product price page" do not appear in the user log. That is, a proportion of the features that already appear among the features of the chunk is one third.

Chunk B to which a weight of "10" is set includes "seminar participation, access to product price page" as the features. "Seminar participation" already appears in the user log, and "access to product price page" does not appear in the user log. Chunk C to which a weight of "1" is set includes "seminar participation" as the feature, and already appears in the user log.

For example, the action decision unit 43 enumerates the chunks with the smallest number of corrections from the chunks having a weight of 10 or more. In the case of FIG. 12, the action decision unit 43 specifies chunk A and chunk B with a weight of 10 or more. Subsequently, the action decision unit 43 determines that there two features of "page access of 20 times or more" and "access to the product price page" which do not appear in the user log in the chunk A and there is one feature of "access to product price page" which does not appear in the user log in the chunk B.

As a result, the action decision unit 43 outputs, as a correction proposal, each chunk, a feature list, and the features that do not appear in the user log in order of chunk B and chunk A to the Web server 6. The Web server 6 that receives the correction proposal performs pop-up and coupon distribution according to the correction proposal.

For example, since it is specified that "access to product price page" is needed in order to satisfy the features of chunk B, the Web server 6 distributes the coupon distribution to the user terminal, and encourages the user to access the product price page. Since it is specified that at least "page access of 20 times or more" is needed in order to satisfy the features of chunk A, the Web server 6 displays the product page on the user terminal in a pop-up, and encourages the user to access the page.

The action decision unit 43 can also present only one correction proposal to the Web server 6. In the case of the aforementioned example, the action decision unit 43 presents chunk B having a small number of corrections and only the feature "access to product price page" which does not appear to the Web server 6.

The action decision unit 43 can present the action to be performed to the Web server 6 instead of the correction proposal. In the case of the aforementioned example, the action decision unit 43 presents, as a recommended behavior, "coupon distribution" as the action for encouraging the user to access the product price page to the Web server 6.

Flow of Learning Process

Figure 13:
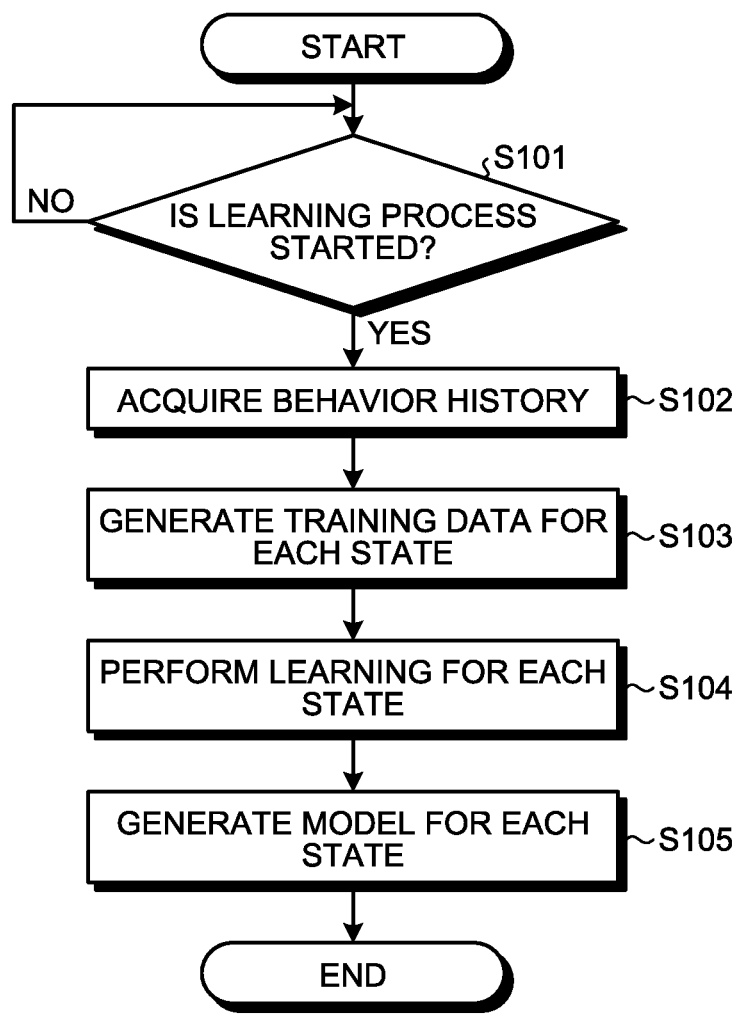
FIG. 13 is a flowchart illustrating a flow of a learning process.

FIG. 13 is a flowchart illustrating a flow of the learning process. As illustrated in FIG. 13, when a timing at which the learning is started comes due to the reception of an instruction of an administrator or the arrival of a periodic timing (S101: Yes), the acquisition unit 31 of the learning processing unit 30 acquires the behavior history of each user from the database server 7 (S102).

Subsequently, the generation unit 32 generates the training data for each state from the behavior history of each user (S103). The learning unit 33 performs the learning for each state by using the training data (S104), and generates the determination model for each state (S105).

Flow of Determination Process

Figure 14:
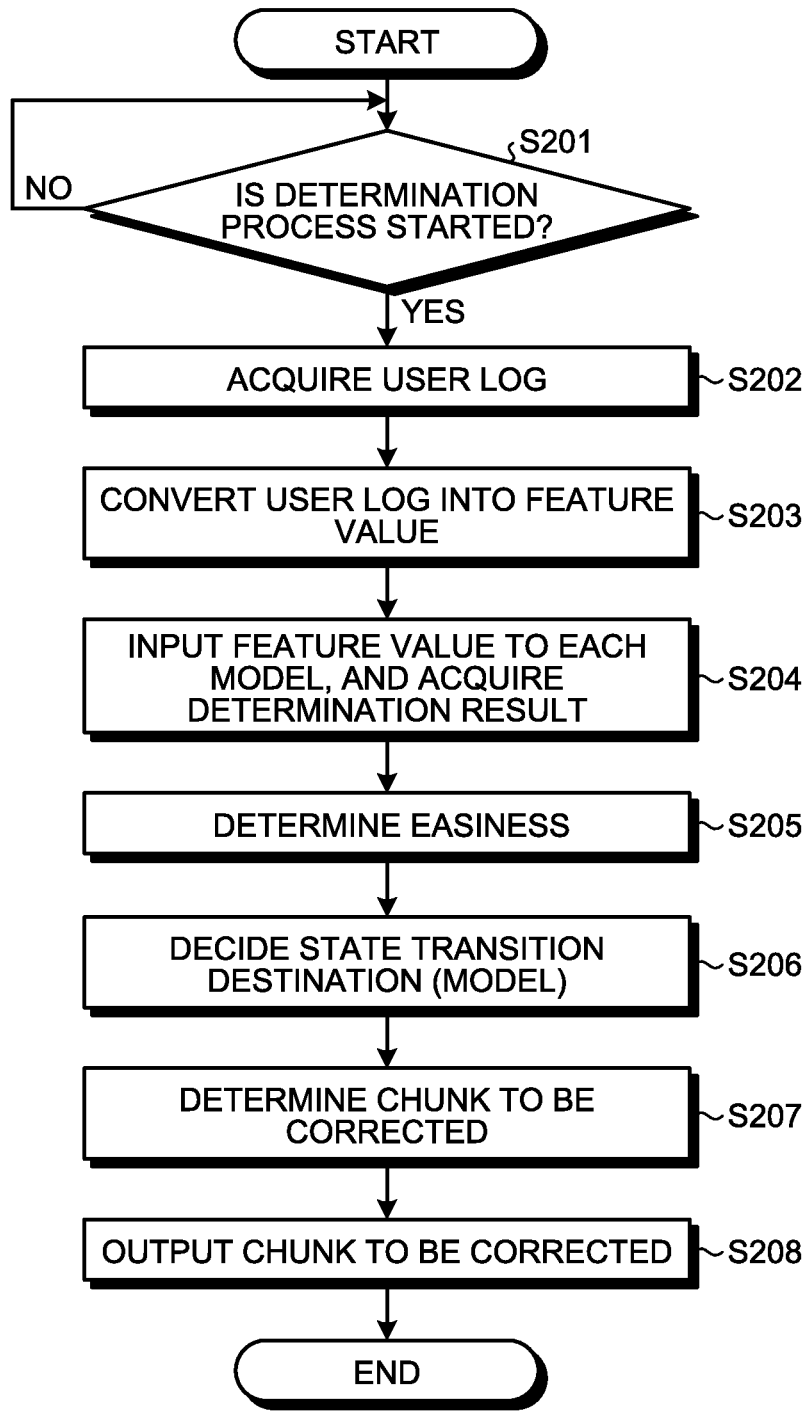
FIG. 14 is a flowchart illustrating a flow of an action determination process.

FIG. 14 is a flowchart illustrating a flow of the action determination process. As illustrated in FIG. 14, when a timing at which the determination process is started comes according to an instruction of the administrator (S201: Yes), the conversion unit 41 of the determination processing unit 40 acquires the user log to be determined from the Web server 6 (S202). Subsequently, the conversion unit 41 converts the user log into the feature value in the same manner as in the learning (8203).

The determination unit 42 inputs the feature value of the user log to each learned determination model, and acquires each determination result (S204). Subsequently, the determination unit 42 determines the state of the user and the easiness of the state transition to each state from each determination result (S205). Thereafter, the determination unit 42 determines the state transition destination based on the current state of the user and the easiness (S206).

The action decision unit 43 specifies the chunk to be corrected from the output result of the determination model corresponding to the state determined as the next transition destination (S207), and outputs the chunk to be corrected to the Web server 6 (S208).

Effects

As described above, when user data is given, the model generation server 10 can detect the states that are close to the final target state among the plurality of states and are the easiest to change, and can list the states in descending order of the state having high effectiveness in correcting the features such that the state thereof is determined to be positive. Therefore, since an action from the behavior history in the manual manner is not considered in order to cause the user to transition to the state, the cost can be reduced, and the process can be performed in real time, the model generation server 10 can efficiently encourage the user to transition to the state.

[b] Second Embodiment

Incidentally, although it has been described in the first embodiment that the user state is unknown, the present invention is not limited thereto, and the same process can be performed even when the user state is known. Thus, in the second embodiment, an example in which an action for causing the user to transition to the next state is decided when the user state is known will be described. The learning method is the same as that in the first embodiment.

Figure 15:
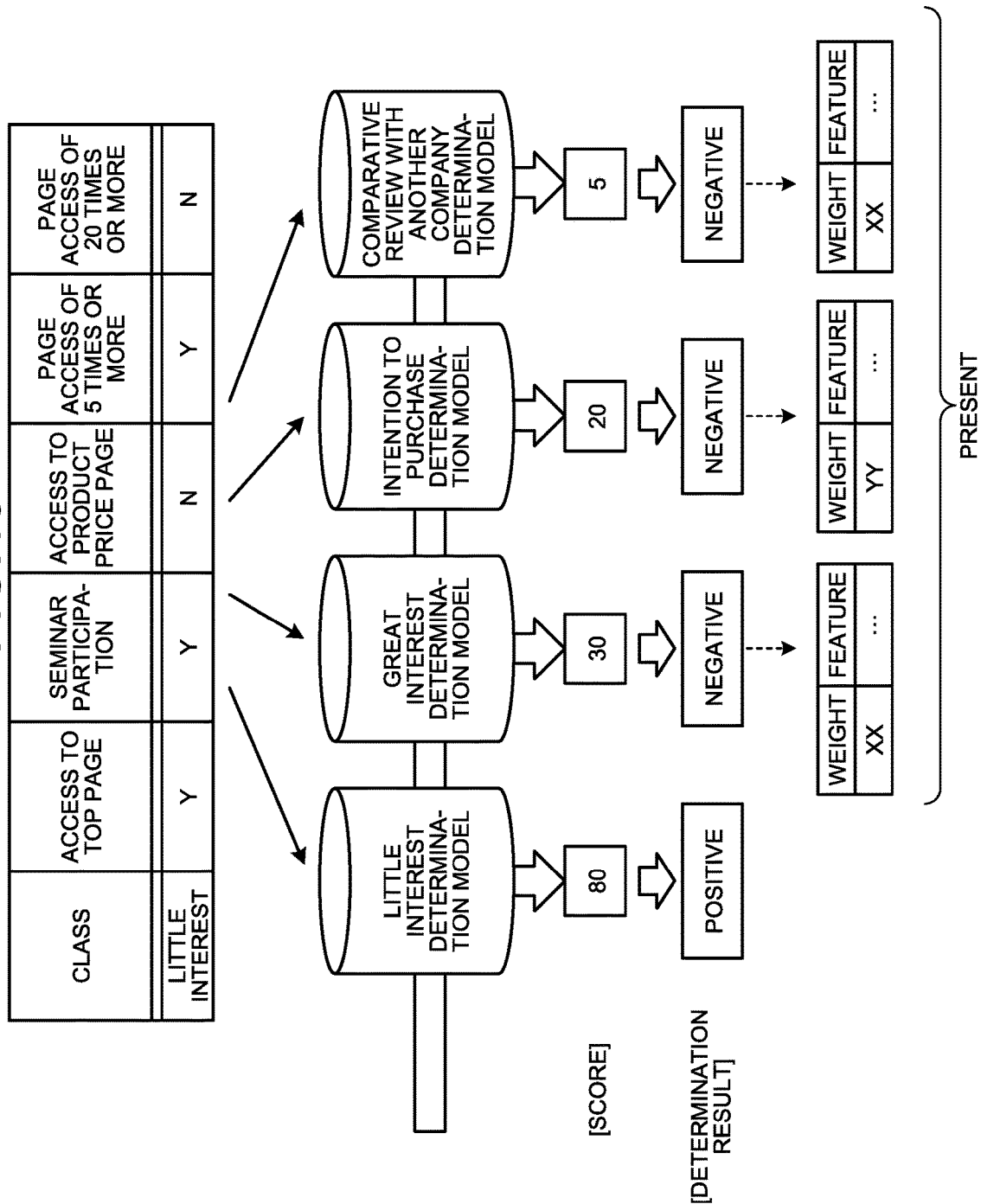
FIG. 15 is a diagram for describing an example of a determination method when a state according to a second embodiment is known.

FIG. 15 is a diagram for describing an example of a determination method when the state according to the second embodiment is known. As illustrated in FIG. 15, the model generation server 10 converts the user log of the user whose state (class) is "little interest" into the feature value "(top page access, seminar participation, access to product price page, page access of 5 times or more, page access of 20 times or more)=(Y, Y, N, Y, N)".

Subsequently, the model generation server 10 inputs the feature value (Y, Y, N, Y, N) of the user log to each learned determination model of the little interest determination model, the great interest determination model, the intention to purchase determination model, and the comparative review with another company determination model.

The model generation server 10 acquires the determination result from each learned model. Here, the model generation server 10 acquires a score "80" from the little interest determination model, a score "30" from the great interest determination model, a score "20" from the intention to purchase determination model, and a score "5" from the comparative review with another company determination model.

Thereafter, the model generation server 10 acquires the determination result of the great interest determination model corresponding to the next state of the "little interest" state which is the known state. The model generation server 10 presents unachieved chunks and the features thereof to the Web server 6 among the chunks obtained by the great interest determination model. At this time, the model generation server 10 can present all the unachieved chunks, and can present the chunk having the largest weight among the unachieved chunks. The model generation server 10 can present the score of each state other than the "little interest" state which is the known state and the unachieved chunk list to the Web server 6.

The model generation server 10 can present information indicating which behavior (action) is to be corrected so as to transition to this state for the score of the state other than the "little interest" state that is the known state. For example, since the score of the intention to purchase determination model is "20", the model generation server 10 determines that a weight of "60" is further needed until the threshold (for example, 80) that can be determined as "positive". The model generation server 10 selects the chunk of which the total value is "60" from the unachieved chunks. Thereafter, the model generation server 10 presents the selected chunk and an unachieved behavior (feature) of the chunk.

As described above, since the action for causing the user to transition from the current state to each state can be specified, the model generation server 10 can perform the action corresponding to the behavior of the user. For example, the model generation server 10 can also encourage a cautious user who is gaining access for several days to transition to a state closer to the final target state at once. The model generation server 10 can also encourage a user who is gaining access for a small amount of time or days to transition to the final target state step by step.

[c] Third Embodiment

Here, a well-known method can be adopted for the generation of hypotheses and the calculation of weights used in each of the above embodiments, and an example thereof will be described.

Generation of Hypotheses

Figure 16:
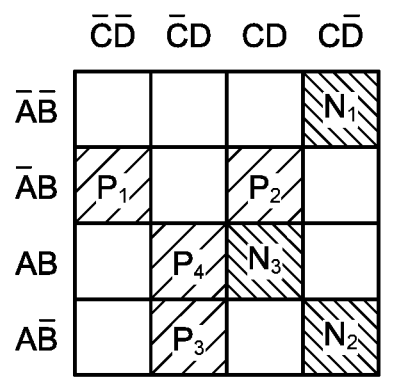

FIG. 16 is an explanatory diagram illustrating an example of the training data. The training data is teaching data for each of a plurality of cases, and includes explanatory variables A to D that explain the nature of the data and objective variables that are classification results (correct answer information) as + or –.

The training data items ($P_1$ to $P_4$, $N_1$ to $N_3$) include the explanatory variables A to D (information used for prediction) that explain the nature of the data, and the objective variables (information to be predicted) which are the correct answer information indicating Class (classification) as + or –. For example, the training data items $P_1$ to $P_4$ are data items of which the objective variables A to D are 0 or 1 and which are classified as +. Similarly, the training data items $N_1$ to $N_3$ are data items of which the objective variables A to D are 0 or 1 and which are classified as –.

For example, in the medical field, in the case of the training data ($P_1$ to $P_4$, $N_1$ to $N_3$) for generating a prediction model that classifies inspection results from inspection data, the explanatory variables A to D are inspection values for each inspection item. The objective variable corresponds to the inspection result such as positive or negative.

Subsequently, the model generation server 10 exhaustively lists combinations of values (unused=*, value=1, value=0) to be obtained, that is, hypotheses for the explanatory variables included in the training data items ($P_1$ to $P_4$, $N_1$ to $N_3$).

The number of explanatory variables to be combined may have a limitation (condition) of being a predetermined number or less. For example, in the case of four explanatory variables A to D, the number of explanatory variables to be combined may be limited to 2 or less (combining at least two of the four explanatory variables with "unused=*"). Accordingly, it is possible to suppress an increase in combination in advance.

Next, the model generation server 10 selects a predetermined combination from the listed combinations. Subsequently, the model generation server 10 classifies the selected combination as one of the training data items ($P_1$ to $P_4$, $N_1$ to $N_3$) based on the explanatory variables and objective variables of the training data items ($P_1$ to $P_4$, $N_1$ to $N_3$), and determines whether or not the selected combination is the valid combination satisfying the specific condition.

Figure 17:
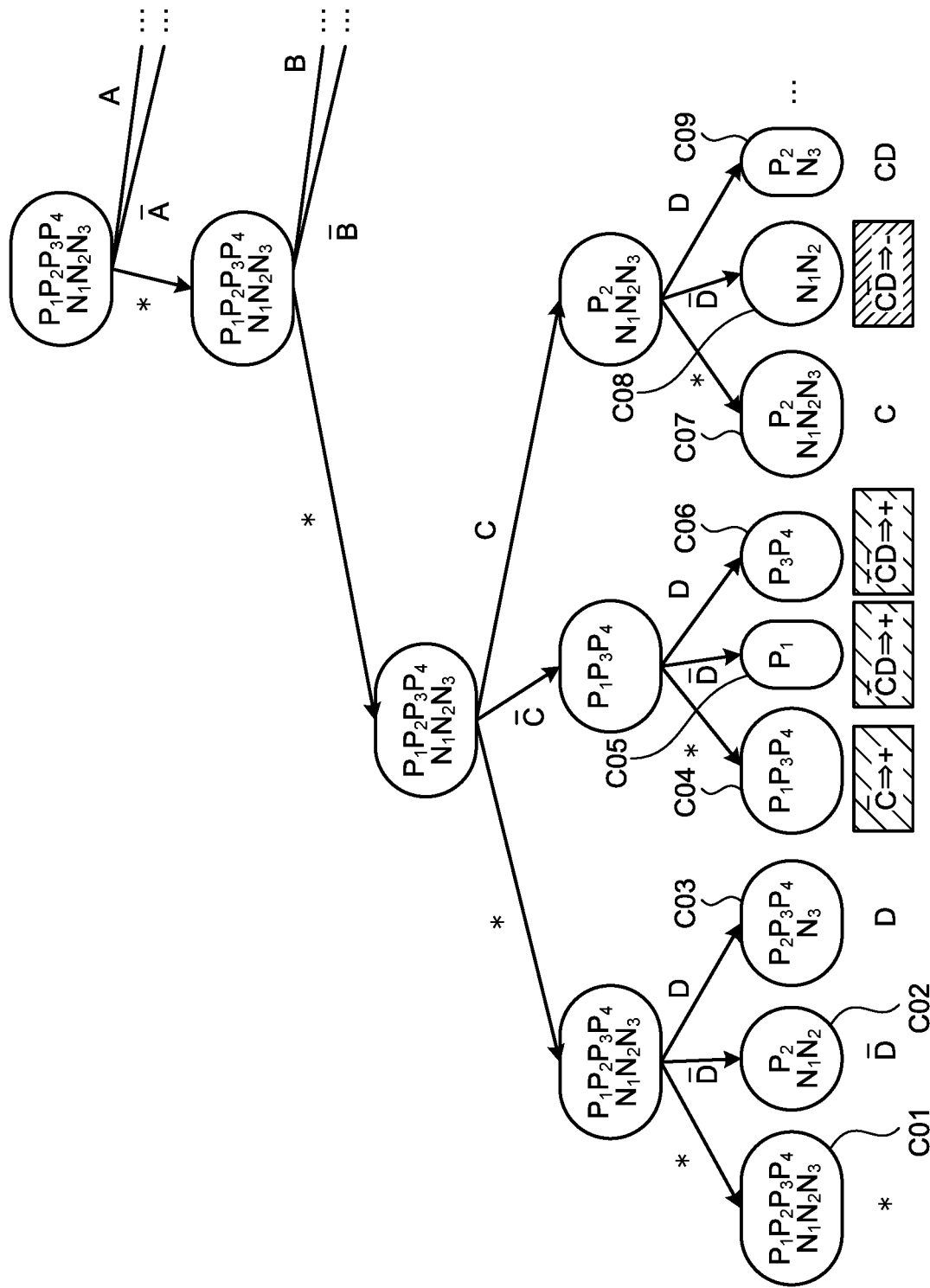
FIG. 17 is an explanatory diagram for describing generation of hypotheses.

FIG. 17 is an explanatory diagram for describing the generation of the hypotheses. In FIG. 17, a combination C01 of which all the four explanatory variables A to D are "*" to a combination C09 having the explanatory variables C and D (A and B are "*") are illustrated as examples.

As illustrated in FIG. 17, the model generation server 10 lists the training data items ($P_1$ to $P_4$, $N_1$ to $N_3$) corresponding to the hypotheses (rules) of the combinations C01 to C09 based on the explanatory variables of the training data items ($P_1$ to $P_4$, $N_1$ to $N_3$).

For example, the training data items $P_2$, $N_1$, and $N_2$ correspond to the rule of the D-bar (the remaining three explanatory variables are "unused=*") of the combination C02. In the rule (D-bar) of the combination C02, the training data ($P_2$) of which the objective variables are + and the training data items ($N_1$, $N_2$) of which the objective variable is – are mixed. Therefore, the combination C02 has a low possibility as the hypothesis that correctly explains the classification into a certain class, and is not the valid combination.

Here, the training data items ($P_1$, $P_3$, $P_4$) of which the objective variables are + correspond to the rule (C-bar) of the combination C04. That is, the rule of the combination C04 has a high possibility of being a rule that correctly explains that the number or proportion of the training data items ($P_1$, $P_3$, $P_4$) classified into the class of + is equal to or greater than a predetermined value and is classified into the class of +. Therefore, the model generation server 10 determines that the combination C04 (C-bar) is the valid combination (hypothesis) to be classified into the class of +. Similarly, the model generation server 10 determines that the combinations C05 and C06 are valid combinations (hypotheses) that are classified into the class of +.

The training data items ($N_1$, $N_3$) of which the objective variables are − correspond to the rule (C and D-bar) of the combination C08. That is, the rule of the combination C08 has a high possibility of being a rule that correctly explains that the number or proportion of the training data items ($N_1$, $N_3$) classified into the − class is equal to or greater than a predetermined value and is classified into the class of −. Therefore, the model generation server 10 determines that the combination C08 (C and D-bar) is the valid combination (hypothesis) to be classified into the class of −.

The number or proportion of the training data items ($P_1$ to $P_4$, $N_1$ to $N_3$) classified into a predetermined class which is a condition for determining the valid combination may be arbitrarily set. For example, since the training data items are mixed with noise, a predetermined number of classes (for example, −) opposite to a predetermined class (for example, +) may be set to be allowed.

For example, when noise for one training data is allowed, the combination C03 (D) is determined as the valid combination (hypothesis) classified into the class of +. Similarly, the combination C07 (C) is determined as the valid combination (hypothesis) classified into the class of −.

When the combination is not valid, the model generation server 10 advances the process without adding the selected combination to the hypothesis set. Meanwhile, when the combination is valid, the model generation server determines whether or not the selected combination is a special case of another hypothesis included in the hypothesis set.

For example, the C-bar and D of the combination C05 and the C-bar and D-bar of the combination C06 in FIG. 17 are created by adding new literals to the C-bar of the combination C04. The model generation server 10 determines that such combinations C05 and C06 are special cases of the C-bar of the combination C04.

Figure 18:
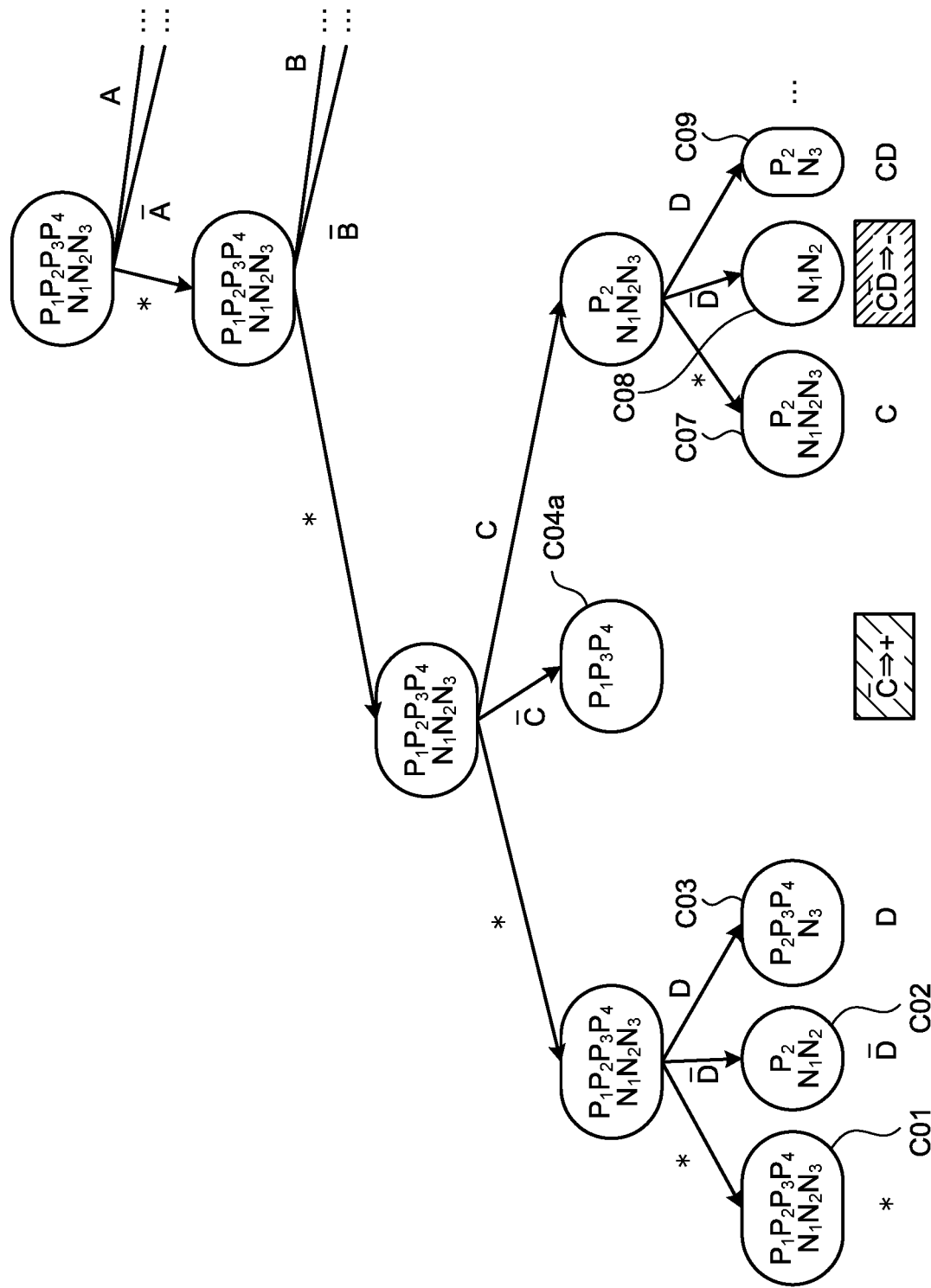
FIG. 18 is an explanatory diagram for describing the generation of the hypotheses.

FIG. 18 is an explanatory diagram for describing the generation of the hypotheses. As illustrated in FIG. 18, the model generation server 10 omits the combinations (combinations C05, C06) that are the special cases of the C-bar and leaves a combination C04a of the C-bar as a hypothesis set.

When the combination is not the special case, the model generation server 10 adds the selected combination to a hypothesis set of hypothesis set data 23. Subsequently, the model generation server 10 determines whether or not all the listed combinations are selected. The above-described processes are repeated, and thus, all the hypotheses that are likely to correctly explain the prediction corresponding to the objective variables of the training data items are listed in the hypothesis set without leak.

Figure 19:
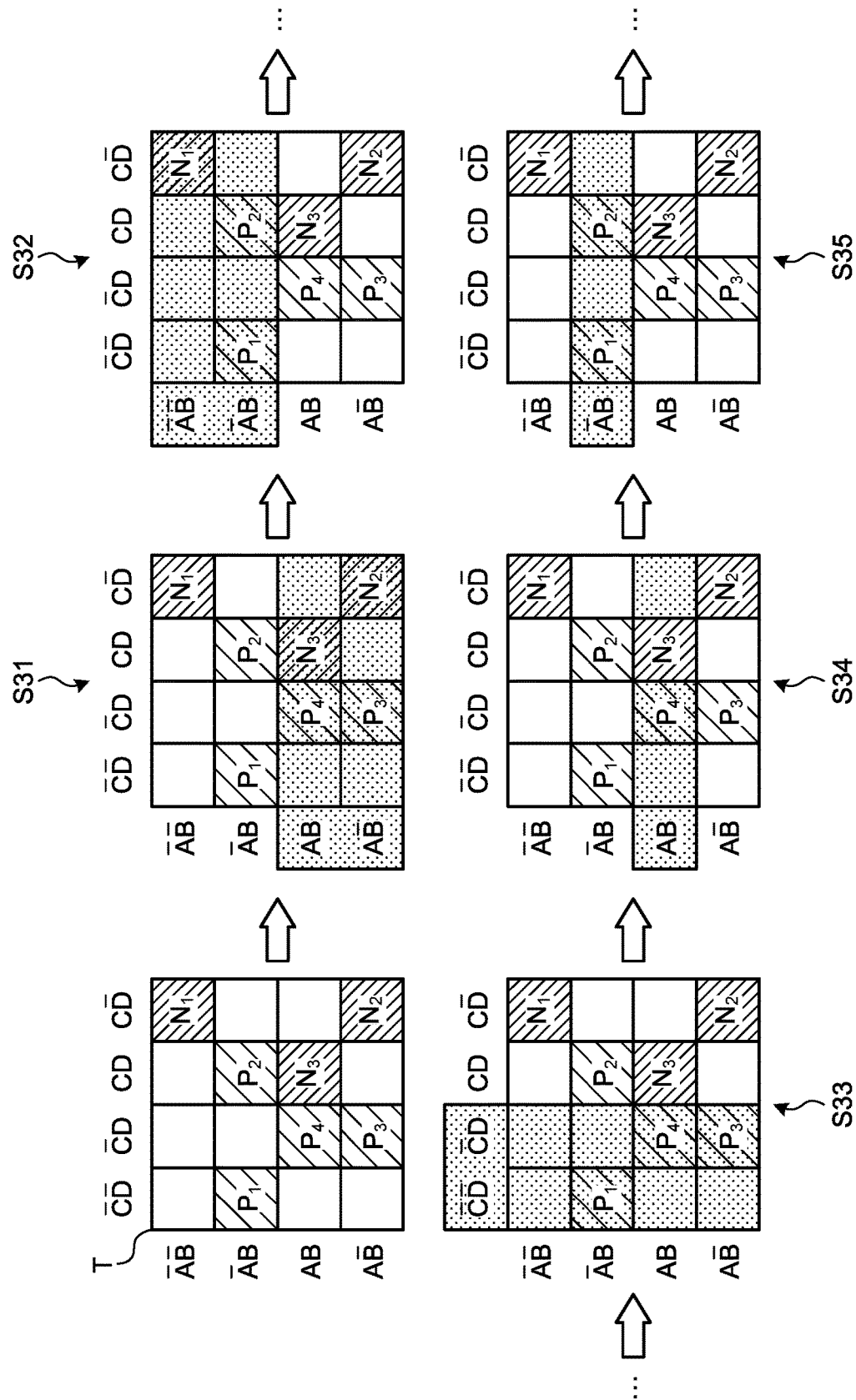
FIG. 19 is an explanatory diagram for describing the generation of the hypotheses.

FIG. 19 is an explanatory diagram for describing the generation of the hypotheses, and is specifically a diagram for describing the contents of FIGS. 17 and 18 by using a Karnaugh map. As illustrated in FIG. 19, the model generation server 10 examines whether or not the combination of A (the remaining 3 explanatory variables are "unused=*") (S31), the combination of A-bar (the remaining 3 explanatory variables are "unused=*"), . . . are the valid combinations while changing the combinations in this order (S31 to S35 . . . ).

Here, the combination of (C-bar) in S33 corresponds to the training data items ($P_1$, $P_3$, $P_4$) of which the objective variables is +. That is, in S33, the number or proportion of the training data items ($P_1$, $P_3$, $P_4$) classified into the class of + is greater than or equal to a predetermined value. Therefore, the combination of (C-bar) in S33 is determined as the valid combination (hypothesis) classified into the class of +. In the following processes, the combinations that add literals to (C-bar) are excluded.

Subsequently, after all combinations in which the three explanatory variables are "unused=*" are examined, the examination of combinations in which the two explanatory variables are "unused=*" is started (S34). Here, the training data items ($P_1$, $P_2$) of which the objective variables are + correspond the combination of (A-bar and B) in 835. That is, in S35, the number or proportion of the training data items ($P_1$, $P_2$) classified into the class of + is equal to or greater than a predetermined value. Therefore, the combination of (A-bar and B) in S35 is determined as the valid combination (hypothesis) classified into the class of +.

Figure 20:
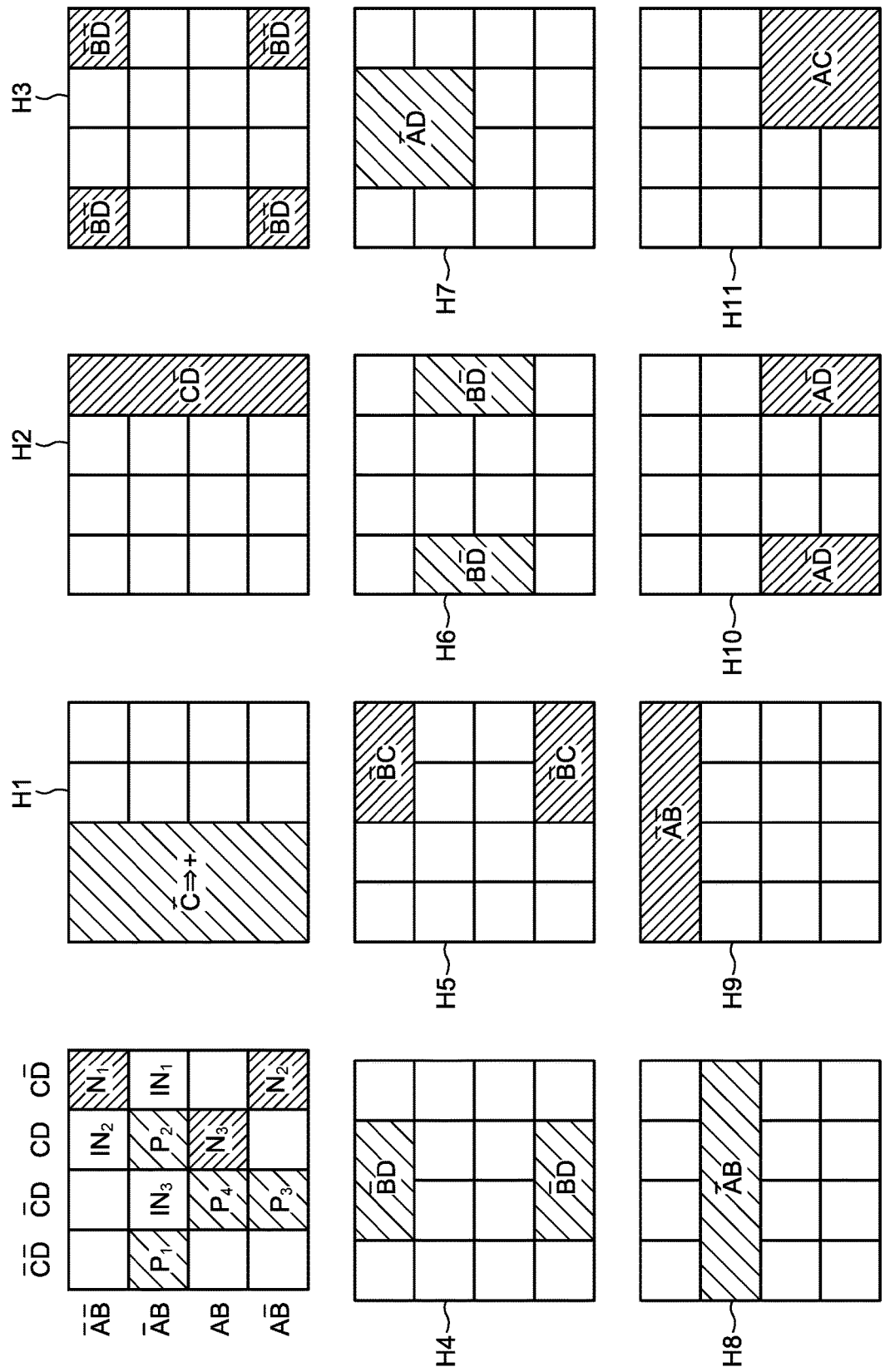
FIG. 20 is an explanatory diagram illustrating examples of the generated hypotheses.

FIG. 20 is an explanatory diagram illustrating examples of the generated hypotheses. As illustrated in FIG. 20, from the training data items ($P_1$ to $P_4$, $N_1$ to $N_3$), hypotheses H1 to H11 with a classification result of + or − are generated, and are stored as hypothesis set data in the storage unit.

Each of these hypotheses H1 to H11 is an independent hypothesis having requirements to correctly explain that the classification results of the training data items ($P_1$ to $P_4$, $N_1$ to $N_3$) are + or −. Therefore, contradictory hypotheses such as hypothesis H2 and hypothesis H6 may be included.

The prediction results from the appropriate hypotheses of the hypotheses H1 to H11 can be obtained for input data items ($IN_1$, $IN_2$, $IN_3$) which are not included in the training data items ($P_1$ to $P_4$, $N_1$ to $N_3$).

FIG. 21 is an explanatory diagram for describing the hypotheses appropriate for the input data items ($IN_1$, $IN_2$, $IN_3$). As illustrated in FIG. 21, the C and D-bar of the hypothesis H2⇒−, the B and D-bar of the hypothesis H6⇒+, and the A-bar and B of the hypothesis H8⇒+ are the hypotheses appropriate for the input data $IN_1$. The B-bar and D of the hypothesis H4⇒+, the B-bar and C of the hypothesis H5⇒−, the A-bar and D of the hypothesis H7⇒+, the A-bar and B-bar of the hypothesis H9⇒− are the hypotheses appropriate for the input data $IN_2$. The C-bar of the hypothesis H1⇒+, the A-bar and D of the hypothesis H7⇒+, and the A-bar and B of the hypothesis H8⇒+ are the hypotheses appropriate for the input data $IN_3$.

Calculation of Weight

When there is no unselected combination, the model generation server 10 calculates weights of the hypotheses (H1 to H11) based on whether or not the hypotheses (H1 to H11) included in the hypothesis set of the hypothesis set data are established for the training data items ($P_1$ to $P_4$, $N_1$ to $N_3$), and stores, as weight data, the calculation results in the storage unit.

The weight calculation in the model generation server 10 may be, for example, any of the following three methods.

It is assumed that all the rules (H1 to H11) have a weight of 1 (majority decision based on the number of rules).

It is assumed that the rules have a weight corresponding to the number of training data items ($P_1$ to $P_4$, $N_1$ to $N_3$) supporting (corresponding to) the rules (H1 to H11).

Weighting using logistic regression to which the training data items ($P_1$ to $P_4$, $N_1$ to $N_3$) are applied is performed.

Figure 22:
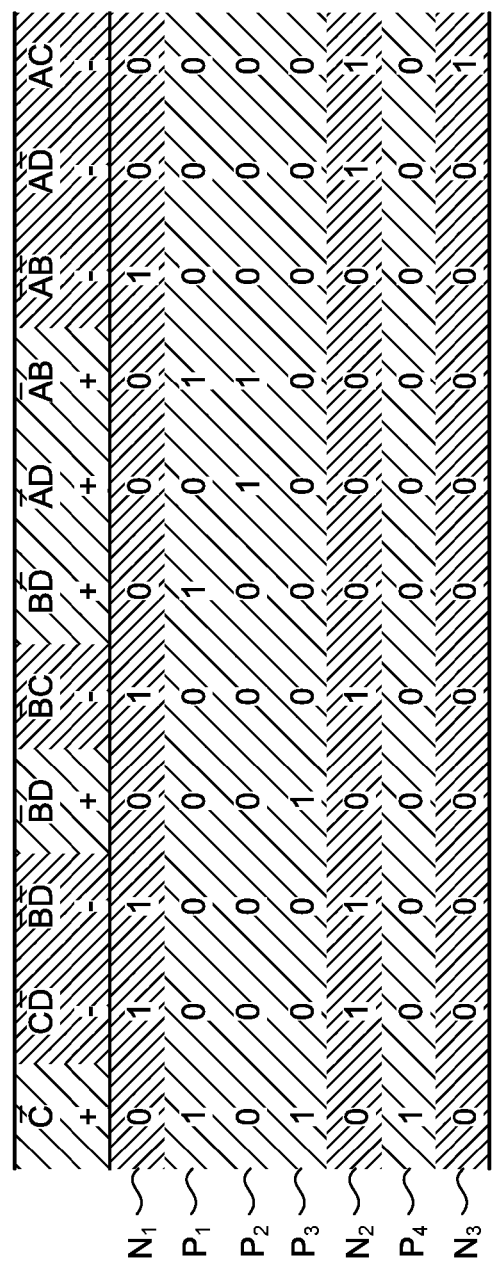
FIG. 22 is an explanatory diagram for describing weighting using logistic regression.

FIG. 22 is an explanatory diagram for describing weighting using the logistic regression. In the logistic regression, as illustrated in FIG. 22, the training data items ($P_1$ to $P_4$, $N_1$ to $N_3$) are applied to a model formula, and weights ($\beta_1$ to $\beta_{11}$) related to the hypotheses H1 to H11 are obtained. Here, the hypotheses may be selected according to the weights of the hypotheses (H1 to H11) obtained by the logistic regression.

Due to the use of the above-described method, the model generation server 10 selects the hypotheses from the training data items, calculates the weights for the hypotheses, and performs the learning of each determination model that determines each state.

[d] Fourth Embodiment

Although the embodiments of the present invention have been described, the present invention may be implemented in various different forms other than the aforementioned embodiments.

Learning

For example, a timing when the learning process is finished can be arbitrarily set such as a point of time when the learning using a predetermined number or more of training data items is completed or a point of time when the loss of each model is less than a threshold. General machine learning can be used as the learning method. The features, chunks, and action contents described in the aforementioned embodiments are merely examples, and can be arbitrarily changed.

Processing Target

Although it has been described in the aforementioned embodiment that the access log on the Web server is used as an example, the present invention is not limited thereto, and for example, a walking log or a system log can be used. Little tired or very tired is determined as the state in the case of the walking log, and a normal operation, a failure sign, or a failure is determined as the state in the case of the system log.

Determination Model

Although it has been described in the aforementioned embodiments that the plurality of determination models corresponding to the plurality of states is used, the present invention is not limited thereto. For example, when it is desired to transition to a certain state such as the "intention to purchase" state, only the determination model corresponding to the certain state can be used. At this time, the model generation server 10 can display a hypothesis list (weight, feature) characterizing the determination model, as the determination result of the determination model. The model generation server 10 can present only the lacking features to the Web server 6 for the hypotheses having the weight equal to or greater than the threshold. Each determination model is an example of the learning model.

System

The processing procedures, control procedures, specific names, and information including various data and parameters illustrated in the aforementioned documents and drawings can be arbitrarily changed unless otherwise specified.

The components of the illustrated apparatuses and devices are the functionally conceptual components, and do not necessarily need to be the physical components. That is, the specific form of the distribution and integration of the apparatuses and devices is not limited to the illustrated form. That is, all or a part of the components can be functionally or physically distributed and integrated in arbitrary units according to various loads and utilization situations. For example, the learning processing unit 30 and the determination processing unit 40 can be realized by separate devices. The determination unit 42 is an example of an input unit and a specification unit, and the action decision unit 43 is an example of a determination unit.

All or any part of the processing functions performed in the devices may be realized by a CPU and a program analyzed and executed by the CPU, or may be realized as wired logic hardware.

Hardware

Figure 23:
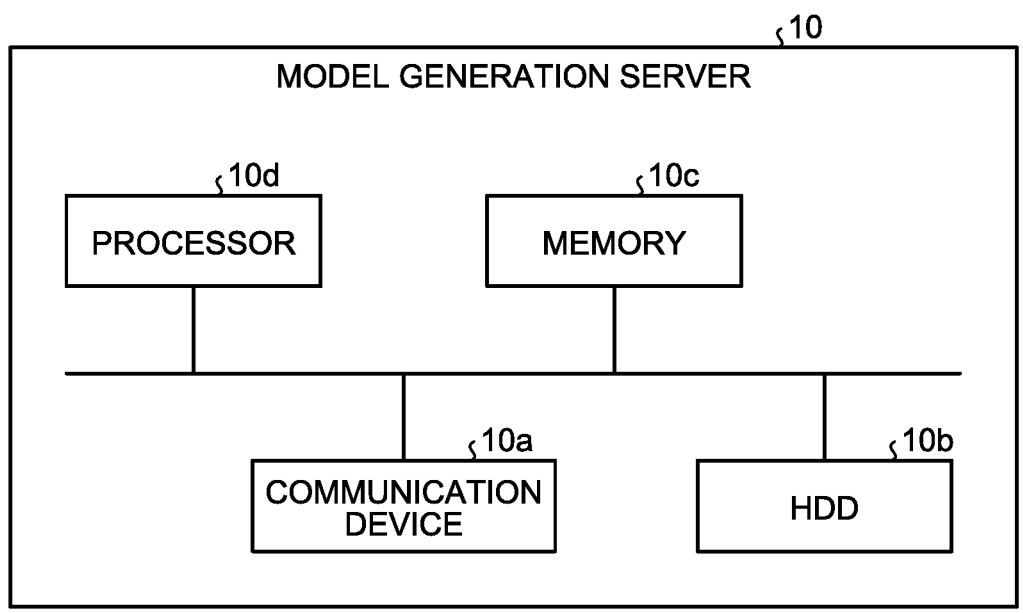
FIG. 23 is a diagram for describing a hardware configuration example.

FIG. 23 is a diagram for describing a hardware configuration example. As illustrated in FIG. 23, the model generation server 10 includes a communication device 10a, a hard disk drive (HDD) 10b, a memory 10c, and a processor 10d. The units illustrated in FIG. 23 are connected to each other by a bus.

The communication device 10a is a network interface card, and communicates with other servers. The HDD 10b stores a program and a DB for operating the functions illustrated in FIG. 3.

The processor 10d operates a process of performing the functions described with reference to FIG. 3 by reading out a program of performing the same processes as those of the processing units illustrated in FIG. 3 from the HDD 10b and loading the program in the memory 10c. That is, these processes perform the same functions as those of the processing units included in the model generation server 10. Specifically, the processor 10d reads out a program having the same functions as those of the learning processing unit 30 and the determination processing unit 40 from the HDD 10b. The processor 10d executes a process of performing the same processes as those of the learning processing unit 30 and the determination processing unit 40.

As described above, the model generation server is operated as the information processing apparatus that performs the model generation method by reading out and executing the program. The model generation server 10 can realize the same functions as those of the above-described embodiments by reading out the program from a recording medium by a medium reading device and executing the readout program. The program referred to in other embodiments is not limited to being executed by the model generation server 10. For example, when another computer or server executes the program or when another computer and another server execute the program in cooperation with each other, the present invention can be similarly applied.

According to one aspect, it is possible to efficiently encourage state transition of a user.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a determination program that causes a computer to execute a process comprising:
inputting behaviors of a target to a trained machine learning model that associates likelihoods respectively with first combinations of behaviors by learning training data that includes second combinations of behaviors taken by persons who are in a specific state among a plurality of states, wherein the likelihoods indicate certainty that a person is in the specific state, and the first combinations of behaviors are generated from behaviors included in the training data;

specifying, for each of the likelihoods, a difference between each of the first combinations of behaviors and the behaviors of the target, when output results of the trained machine learning model indicate that the target is not in the specific state;

determining an additional behavior for causing the target to transit to the specific state based on the specified difference and a likelihood that is associated with the difference; and acquiring, as the output results, the first combinations of behaviors, the likelihoods, and the specified difference from the trained machine learning model; and outputting the output results to a server device that provides a service to the target, wherein the determining includes specifying the additional behavior including a combination of behaviors associated with a likelihood equal to or greater than a threshold with which the target is determined as being in the specific state, as a recommended behavior for the target.

2. The non-transitory computer-readable recording medium according to claim 1, wherein the process further comprises:

inputting the behaviors of the target to each of trained machine learning models respectively corresponding to the plurality of states;

acquiring a score obtained by adding up likelihoods respectively associated with combinations of behaviors including a behavior of the target from each of the trained machine learning models; and specifying a state of the target based on the score acquired from each of the trained machine learning models.

3. The non-transitory computer-readable recording medium according to claim 2, wherein the plurality of states is states at which a person sequentially transits from an initial state to a final target state, and the specifying includes specifying a state at which the score is equal to or greater than a threshold among scores acquired from each of the trained machine learning models respectively corresponding to the plurality of states, the state being closest to the final target state, as the state of the target.

4. The non-transitory computer-readable recording medium according to claim 3, wherein, the specifying includes acquiring a proportion with which the behaviors of the target are included in each of the first combinations of behaviors that are of the trained machine learning model for the specific state which is a next state of the state of the target, and the determining includes specifying from among the first combinations of behaviors a combination of behaviors that corresponds to a likelihood equal to or greater than a threshold and for which the proportion is highest, and determining, as the additional behavior, a behavior from among the specified combination, which is not included in the behaviors of the target.

5. A determination method comprising:

inputting behaviors of a target to a trained machine learning model that associates likelihoods respectively with first combinations of behaviors by learning training data that includes second combinations of behaviors taken by persons who are in a specific state among a plurality of states, wherein the likelihoods indicate certainty that a person is in the specific state, and the first combinations of behaviors are generated from behaviors included in the training data, using a processor;

specifying, for each of the likelihoods, a difference between each of the first combinations of behaviors and the behaviors of the target, when output results of the trained machine learning model indicate that the target is not in the specific state, using the processor;

determining an additional behavior for causing the target to transit to the specific state based on the specified difference and a likelihood that is associated with the difference, acquiring, as the output results, the first combinations of behaviors, the likelihoods, and the specified difference from the trained machine learning model; and outputting the output results to a server device that provides a service to the target, wherein the determining includes specifying the additional behavior including a combination of behaviors associated with a likelihood equal to or greater than a threshold with which the target is determined as being in the specific state, as a recommended behavior for the target, using the processor.

6. An information processing apparatus comprising:

a memory; and a processor coupled to the memory, wherein the processor is configured to:

input behaviors of a target to a trained machine learning model that associates likelihoods respectively with first combinations of behaviors by learning training data that includes second combinations of behaviors taken by persons who are in a specific state among a plurality of states, wherein the likelihoods indicate certainty that a person is in the specific state, and the first combinations of behaviors are generated from behaviors included in the training data;

specify, for each of the likelihoods, a difference between each of the first combinations of behaviors and the behaviors of the target, when output results of the trained machine learning model indicate that the target is not in the specific state;

determine an additional behavior for causing the target to transit to the specific state based on the specified difference and a likelihood that is associated with difference; and acquire, as the output results, the first combinations of behaviors, the likelihoods, and the specified difference from the trained machine learning model; and output the output results to a server device that provides a service to the target, wherein the determining includes specifying the additional behavior including a combination of behaviors associated with a likelihood equal to or greater than a threshold with which the target is determined as being in the specific state, as a recommended behavior for the target.

* * * * *